(12) United States Patent
Kume

(10) Patent No.: US 6,203,433 B1
(45) Date of Patent: Mar. 20, 2001

(54) NETWORK GAME SYSTEM, A NETWORK GAME SERVER, A NETWORK GAME CLIENT, A PLAYER SELECTION PROGRAM, A MEDIUM STORING A PLAYER SELECTION PROGRAM, AND A MEDIUM STORING A PLAYER INFORMATION COLLECTION PROGRAM

(75) Inventor: Hiroshi Kume, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/134,355

(22) Filed: Aug. 14, 1998

(30) Foreign Application Priority Data

Aug. 20, 1997 (JP) .................................................. 9-223652

(51) Int. Cl.[7] ..................................................... F16D 7/02
(52) U.S. Cl. ........................ 463/42; 463/41; 395/200.57
(58) Field of Search .................................. 463/42, 41, 40, 463/43, 17, 18, 19; 364/410.1; 395/200.57, 200.58

(56) References Cited

U.S. PATENT DOCUMENTS

| | | | |
|---|---|---|---|
| 5,558,339 | * | 9/1996 | Perlman .................................. 463/42 |
| 5,761,507 | * | 6/1998 | Govett .................................. 395/684 |
| 5,790,789 | * | 8/1998 | Suarez .................................. 395/200 |
| 5,793,964 | * | 8/1998 | rogers et al. ..................... 395/200.32 |
| 5,862,220 | * | 1/1999 | Perlman .................................. 380/21 |
| 5,862,339 | * | 1/1999 | Bonnaure et al. ............... 395/200.57 |
| 5,899,810 | * | 5/1999 | Smith ...................................... 463/42 |
| 5,964,660 | * | 10/1999 | James et al. .............................. 463/1 |
| 5,971,271 | * | 10/1999 | Wynn et al. ........................... 235/380 |
| 6,012,984 | * | 1/2000 | Roseman ................................. 463/42 |
| 6,023,722 | * | 2/2000 | Colyer .................................. 709/201 |

FOREIGN PATENT DOCUMENTS 7-95321    4/1995  (JP) .
B2-7-63546 7/1995  (JP) .

* cited by examiner

Primary Examiner—Lee Young
Assistant Examiner—Minh Trinh
(74) Attorney, Agent, or Firm—Oliff & Berridge, PLC

(57) ABSTRACT

An object of the present invention is to relieve users of efforts to select play partners by themselves. Upon receipt of a game request, a game request response unit returns player request issuance timing information specifying time to issue a player request. A player selection processing unit determines combinations of games at a predetermined timing. Upon receipt of a player request, a player request response unit extracts information about opposing players of a user issuing the player request from a user information storage unit and returns it to a client as a response to the player request. A game request unit of the client outputs a game request to a server and receives player request issuance timing information from the server. When the time specified in the player request issuance timing information is reached, a player request unit outputs a player request to the server and receives information about play partners from the server.

15 Claims, 35 Drawing Sheets

Shogi School

NETWORK GAME SYSTEM, A NETWORK GAME SERVER, A NETWORK GAME CLIENT, A PLAYER SELECTION PROGRAM, A MEDIUM STORING A PLAYER SELECTION PROGRAM, AND A MEDIUM STORING A PLAYER INFORMATION COLLECTION PROGRAM

BACKGROUND OF THE INVENTION

1. Field of the Invention

The present invention relates to a network game system, a network game server, network game clients, a player selection program, a medium storing a player selection program, and a medium storing a player information collection program which are designed to carry out indoor games such as shogi, igo, chess, Othello game, mah-jong, fighting-type television games, and other games, and more particularly to a network game system, a network game server, network game clients, a player selection program, a medium storing a player selection program, and a medium storing a player information collection program which are designed to select play partners from an indefinitely large number of participants.

2. Description of the Prior Art

It has been general that indoor games such as shogi, igo, chess, Othello game, mah-jong, fighting-type television games, and other games are played in a manner that players play them at the same time and at the same place. However, with recent advances in information communication technology, tools have been developed which enable players to play them remotely by connecting computers by communication lines. This allows players to play the games at home. In this case, however, since a person that wants to play is at a specific place, it is difficult to select play partners.

Accordingly, there is provided an easier-to-use player display system which registers information about persons ready to play and displays its contents on the screen of terminal equipment of users who wish to play (Japanese Published Unexamined Patent Application No. Hei 7-95321). Use of this system enables users who wish to play to select opposing players from the screen to obtain play partners, whereby the users can play with the selected play partners.

The same function as that of the above-mentioned system is also implemented by listing users by use of homepages on the Internet.

However, the above-mentioned player display system requires that users themselves look for partners satisfying their requirements by themselves and make contact by themselves. This is difficult in the points described below.
(1) Desired partners with whom to play do not desire to play.
(2) Desired partners with whom to play cannot play immediately because they are playing.
(3) It must be monitored that desired partners with whom to play finish playing.
(4) Time-consuming operations other than the true purpose of playing games, such as displaying information about persons ready to play and selecting proper partners, are required.

SUMMARY OF THE INVENTION

The present invention has been made in consideration of these points and its object is to provide a network game system which relieves users of efforts to select play partners by themselves.

Another object of the present invention is to provide a network game server which automatically selects play partners of a user desiring to play.

Still another object of the present invention is to provide a network game client which can automatically obtain information about partners with whom to play a game.

Further still another object of the present invention is to provide a medium storing a player selection program for instructing computers to automatically select play partners of a user desiring to play.

Yet another object of the present invention is to offer a medium storing a player information collection program for instructing computers to automatically collect information about play partners of a game.

To solve the above-mentioned problems, the present invention provides a network game system in which a game is played among an indefinitely large number of participants on a communication network, comprising: a server including: a user information storage unit that stores information about a plurality of users; a game request response unit that, upon receipt of a game request, places a user issuing the game request in a game queue; and a player selection processing unit that determines combinations of games among users placed in the game queue; and clients including a game request unit that outputs the game request to the server.

According to such a network game system, first, the game request unit outputs a game request to the server. The game request response unit of the server places a user issuing the game request in a game queue. The player selection processing unit determines combinations of games among players placed in the game queue. By this arrangement, combinations of games among users issuing a game request can be automatically determined.

To solve the above-mentioned problems, there is also provided a network game server which manages information about users playing games through a communication network, comprising: a user information storage unit that stores information about a plurality of users; a game request response unit that, upon receipt of a game request from a client, places a user issuing the game request in a game queue; and a player selection processing unit that determines combinations of games among users placed in the game queue.

When a game request is issued from the client, the game request response unit places a user issuing the game request in a game queue and the player selection processing unit determines combinations of games among users placed in the game queue.

To solve the above-mentioned problems, there is also provided a network game client which plays games through a communication network, comprising: a game request unit that outputs a game request to a server and receives player request issuance timing information specifying time to issue a player request, from the server; and a player request unit that, when time specified in the player request issuance timing information is reached, outputs the player request to the server and receives information about opposing players from the server.

According to such a network game client, the game request unit outputs a game request to the server and receives player request issuance timing information from the server. When time specified in the player request issuance timing information is reached, the player request unit outputs a player request to the server and receives information about opposing players from the server.

To solve the above-mentioned problems, there is also provided a medium storing a player selection program for instructing computers to select play partners of users wishing to play games through a communication network, the player selection program comprising: a user information storage unit that stores information about a plurality of users; a game request response unit that, upon receipt of a game request from the client, places a user issuing the game request in a game queue; and a player selection processing unit that determines combinations of games among users placed in the game queue.

If the player selection program is executed by a computer, the functions of the following units are implemented by the computer: the user information storage unit that stores information about a plurality of users; the game request response unit that, upon receipt of a game request from the client, places a user issuing the game request in a game queue; and the player selection processing unit that determines combinations of games among users placed in the game queue.

To solve the above-mentioned problems, there is also provided a medium storing a player information collection program for instructing computers to obtain information about play partners of users wishing to play a game through a communication network, the player information collection program comprising: a game request unit that outputs a game request to a server and receives player request issuance timing information specifying time to issue a player request, from the server; and a player request unit that, when the time specified in the player request issuance timing information is reached, outputs the player request to the server and receives information about opposing players from the server.

If the player information collection program is executed by a computer, the functions of the following units are implemented by the computer in a network game client that plays games through a communication network: the game request unit that outputs a game request to a server and receives player request issuance timing information specifying time to issue a player request, from the server; and the player request unit that, when time specified in the player request issuance timing information is reached, outputs the player request to the server and receives information about opposing players from the server.

DESCRIPTION OF THE PREFERRED EMBODIMENTS

Hereinafter, embodiments of the present invention will be described with reference to the accompanying drawings.

Figure 1:
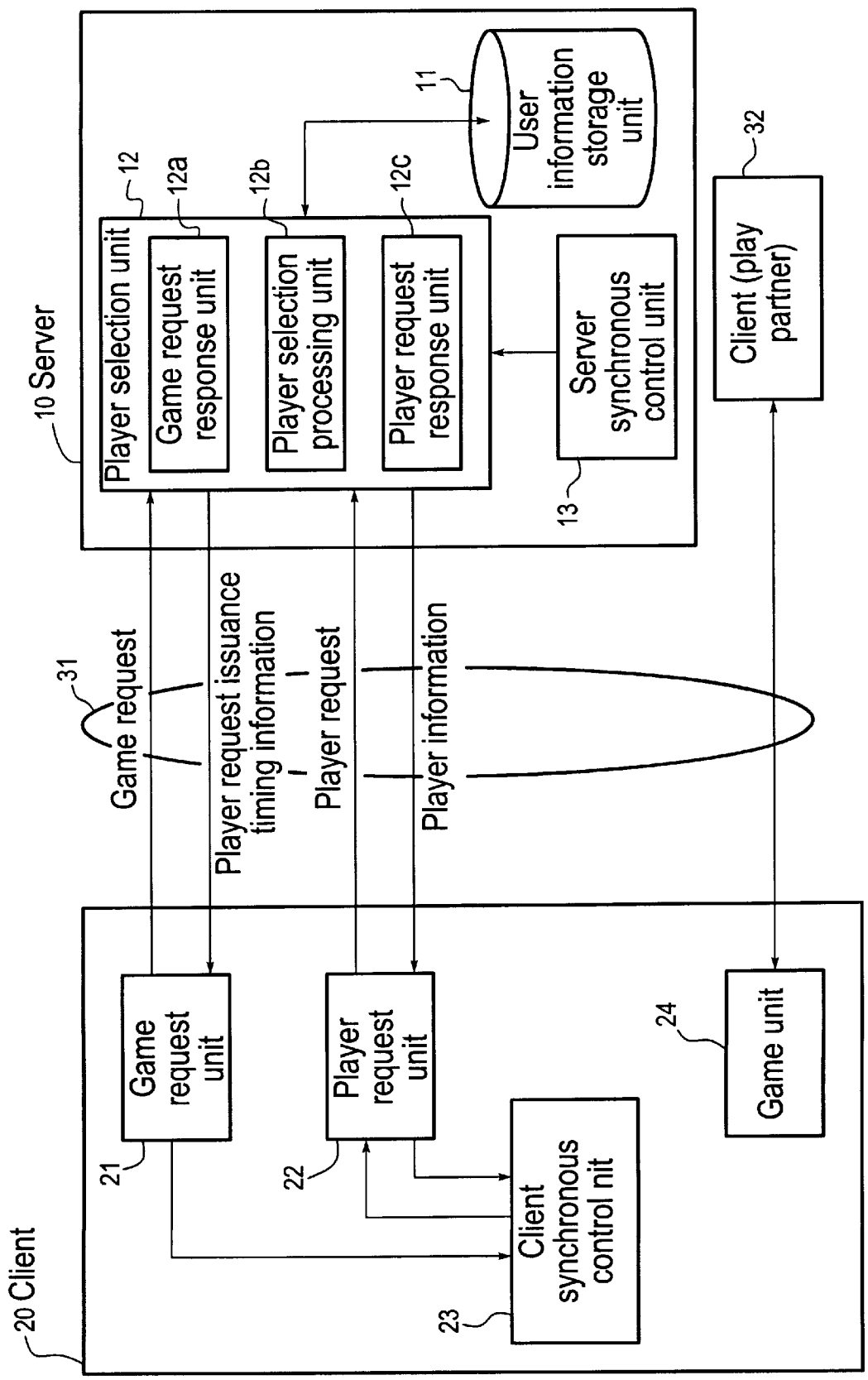
FIG. 1 is a principle configuration diagram of a network game system of the present invention.

FIG. 1 is a principle configuration diagram of a network game system of the present invention. A server and a client 20 according to the present invention are connected through a network 31.

The server 10 comprises a user information storage unit 11, a player selection processing unit 12, and a server synchronous control unit 13. The user information storage unit 11 stores information about a plurality of users.

The player selection processing unit 12 comprises a game request response unit 12a, a player selection processing unit 12b, and a player request response unit 12c. Upon receipt of a game request from the client 20, the game request response unit 12a places a user issuing the game request in a game queue and returns player request issuance timing information specifying time to send a player request. The player request issuance timing information denotes player request issuance wait time at the time of reception of the game request. Its value is obtained by counting down player request wait time received from the server synchronous control unit 13. Upon receipt of a player selection start command, the player selection processing unit 12b determines combinations of games among users placed in the game queue. Upon receipt of a player request from the client 20, the player request response unit 12c extracts information about play partners of a user issuing the player request from the user information storage unit 11 and returns it to the client 20 as a response to the player request.

The server synchronous control unit 13 outputs a player selection start command and player request issuance wait time to the player selection processing unit 12 at a predetermined timing earlier than time to issue a player request.

The client 20 comprises a game request unit 21, a player request unit 22, a client synchronous control unit 23, and a game unit 24.

The game request unit 21 outputs a game request to the server 10 and receives player request issuance timing information from the server 10.

When time specified in the player request issuance timing information is reached, the player request unit 22 outputs a player request to the server 10 and receives play partner information from the server 10. By a player request issuance command being inputted from the client synchronous control unit 23, the player request unit 22 recognizes that it has reached a time specified in the player request issuance timing information.

The game unit 24 plays a game with a client 32 of a play partner specified in play partner information, through a communication network.

The client synchronous control unit 23 counts down player request wait time specified in the player request issuance timing information received by the game request unit 21, and outputs a player request issuance command to the player request unit 22 when the player request issuance wait time becomes 0.

Using a network game system of such a configuration, a user who wish to play inputs a game request issuance command to the game request unit 21. The game request unit 21 outputs a game request to the server 10. The game request is received in the player selection processing unit 12 of the server 10 and player request issuance timing information is returned to the client 20 by the game request response unit 12a. The player request issuance timing information is sent to the client synchronous control unit 23, and when a player request issuance time is reached, a player request issuance command is issued to the player request unit 22. The player request unit 22 then outputs a player request to the server 10.

Meanwhile, in the server 10, the server synchronous control unit 13 outputs a player selection start command at a predetermined timing, and on receiving the command, the player selection processing unit 12b determines combinations of games among users placed in a game queue.

When a player request is sent from the client 20, the player request response unit 12c extracts information about opposing players of the user issuing the player request from the user information storage unit 11 and returns it to the client 20 as a response to the player request. The user of the client 20 uses the game unit 24 to play the game with the client 32 of an opposing player specified in the player information.

With this arrangement, the user of the client 20 can obtain play partners without selecting them by himself.

Hereinafter, an embodiment of the present invention will be described.

Figure 2:
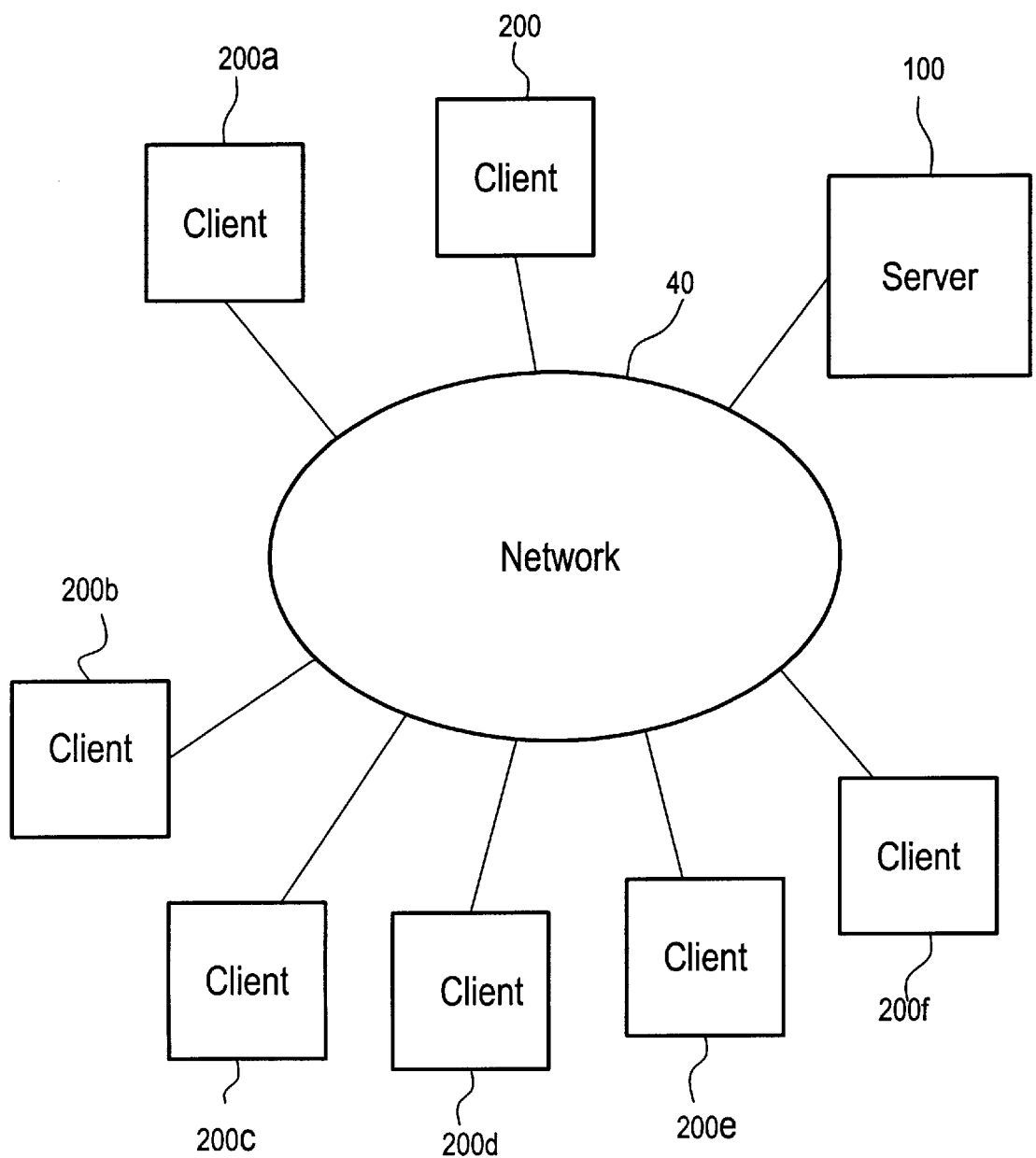
FIG. 2 is a schematic configuration diagram of the overall network game system of the present invention.

FIG. 2 is a schematic configuration diagram of the overall network game system of the present invention. A network game system of the present invention can be divided into a server 100 and clients 200, and 200a to 200f. These components are connected by a network 40 such as a common public network or local network. Although the network 40 is not specifically specified in terms of type, the following description is based on the Internet in view of publicity and simplicity of use.

Although the server 100 may usually be single, a plurality of servers 100 can be installed for each subsystem apparatus or for each subdivided user database (DB) in consideration of processing capacity. There are as many clients 200, and 200a to 200f as there are connected users. The user interface of the clients 200, and 200a to 200f can be implemented by the web browser. A variety of accesses to the server 100 can be made by browsing homepages within the server 100 and performing operations on the homepages.

Server-client communications can be implemented by using HTTP (Hyper Text Transfer Protocol) running on TCP/IP (Transmission Control Protocol/Internet Protocol) as a base protocol and using an application protocol defined in this system as a higher level protocol. Of course, any protocol other than TCP/IP, such as OSI (Open System Interconnection) can also be used.

Table 1 shows application protocols defined in this system.

TABLE 1

| Protocol | Request parameter | Result parameter | Description |
| --- | --- | --- | --- |
| Game request | N, P, A | ta | Users request game. |
| Player request | N, P | Zm, Rm, Am, tb | Inquires about opposing players. Automatically issued by clients. |

Parameters
N: User identifier (uniquely identifies users. Serves as a retrieval key for user DB.)
P: Password (set by users and registered in user DB)
A: User address (IP address of the Internet)
Zm: Information (name, etc.) about play partner
Rm: Level of play partner
Am: Address of play partner
ta: Player request residual time (difference between time when a client issues a player request and current time)
tb: Game start residual time (difference between game start time and current time)
Note: All the protocols described above are issued from a client to a server and the results are returned to the client from the server.

This table shows protocols used in the smallest possible configuration (basic configuration) to implement the present invention wherein the protocols are a game request and a player request. The game request and player request are sent from the clients 200, and 200a to 200f to the server 100 along with necessary parameter information, and the server 100 responds to the requests.

A game request is started by a user clicking on a proper button on a homepage when wishing a game, and is issued to the server 100. Parameter information includes a user identifier N, a password P, and an IP address A. Of course, the password P may have been encrypted by a predetermined encryption system. On receiving the game request, the server 100 authenticates it and, if a valid identifier and a password are paired, determines the user as a registered, legitimate user. As a result, to the legitimate user, the server 100 returns player request residual time ta for the client to issue a player request in the next step.

A player request is automatically issued to the server 100 by the clients 200 and 200a to 200f. Parameter information includes a user identifier N and a password P. The server 100 authenticates the received player request. If the player request has been issued by a legitimate user, the server 100 returns information Zm about a play partner already selected, the IP address Am of the play partner, the level Rm of the play partner, and game start residual time tb.

Figure 3:
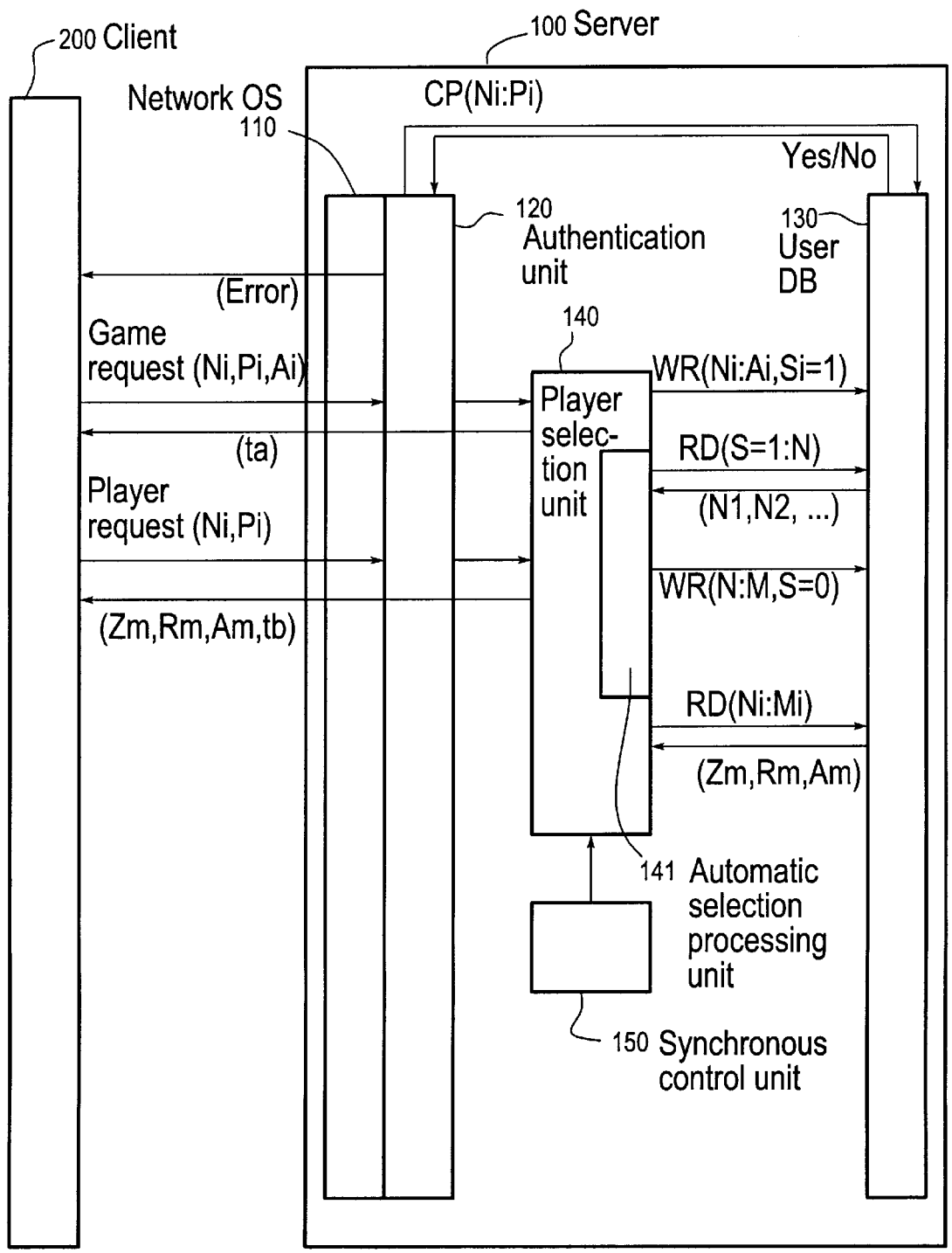
FIG. 3 shows the internal configuration of a server.

FIG. 3 shows the internal configuration of the server. The network OS (Operating System) 110 is a device on which TCP/IP, HTTP, and the protocols shown in Table 1 operate. This enables communications with the clients 200, and 200a to 200f. The function of the network OS 110 is usually implemented by firmware or software. Of course, a network interface card for sending and receiving physical signals is considered already incorporated in the server 100 (the same is also true for the clients 200, and 200a to 200f).

The authentication unit 120 determines whether an accessing user is registered in the system. This can be achieved by comparing (CP) user identifier Ni and password Pi sent as parameters of a request protocol from the clients 200, and 200a to 200f with data of a user DB 130. However, instead of this function, other authentication services, e.g., authentication service using X.500 (international recommendation on directory, defined by ITU-T (International Telecommunication Union-Telecommunication Sector)) can also be used. If the user is an illegitimate user, the authentication unit 120 returns an error message (Error) to the clients 200, and 200a to 200f. If the user is an illegitimate user, the inputted request is transferred to an appropriate processing function unit, depending on the protocol sent.

The user DB 130 stores data of users registered in advance. The contents of the data are shown in Table 2.

DB 130. The player request residual time ta is returned to a client of user Ni. This operation is repeated each time a game request is sent from a user. The player request residual time ta is time until the next automatic selection processing is started, plus time required for selection processing. Specifically, reference time (predetermined time Tg greater than or equal to an automatic selection cycle Tf plus time required for player automatic selection processing) sent from a synchronous control unit 150 is counted down as time elapses as soon as the automatic selection unit 141 is started, and the value at the time when a game request occurs is defined as player request residual time ta.

The player selection processing unit 140 has the automatic selection unit 141 that automatically selects opposing players. The function of the automatic selection unit 141 is started by the synchronous control unit 150. The started automatic selection unit 141 references the user DB 130, reads out information about all users waiting for a game (S=1), and selects opposing players according to a predetermined algorithm. As a result, the identifier of the play partner is set in the play partner M and game history L and 0 is set in status S, for all user N items selected as opposing players from the user DB 130. When a player request is issued from user Ni, the player selection processing unit 140 returns the result of selecting opposing players as a response. This response means that information Zm and address Am of play partner and game start residual time tb are sent to the clients 200, 200a to 200f. Game start residual time tb at the

TABLE 2

| Identifier N | Name Z1 | Address Z2 | Pass-word P | Face photo Z3 | Address A | Level R | Status S | Player M | Player history L |
|---|---|---|---|---|---|---|---|---|---|
| 123 | Taro Fuji | Shizuoka | abc | 123.gif | 123.456 | 2000 | 1 | 38 | 23, 18 . . . |
| 124 | Jiro Suwa | Nagano | def | 124.gif | 987.654 | 1500 | 0 |  | 98, 4 . . . |

Notes:
1. Status S: 0 = Not waiting for a game; 1 = Waiting for a game
2. Z2 and Z3 are optional, not required data.

Identifier N is a symbol for uniquely identifying a user. Identifiers can automatically be assigned by the system at user registration or determined by users. Name Z1 is a user's real name. Address Z2 indicates the place where a user actually lives. Since Z2 is optional, it may not be specified. Password P is data required for authentication and is afforded by users. Of course, password can be changed later. Face photo Z3 is a user's photo image. Since Z3 is also optional, it may not be specified. Address A is the IP address of a client a user is using. Usually, in the case of the Internet, an IP address often changes each time access is made to the Internet. Accordingly, this field may change each time a user gains access to this system. Level R is a score indicating a user's level for the game. It is based on a user's offer at registration. Status S is a status variable used by the system and assumes a value 0 or 1. 0 indicates not waiting for a game and 1 indicates waiting for a game. Player M is the identifier of a partner with whom a user is currently playing the game or the next partner with whom a user is to play the game. Player history L contains the identifiers of partners with whom a game was played within a given period of the past or a given number of plays.

When a game request is issued from user Ni, a player selection processing unit 140 records an address Ai and status S=1 in items having an identifier N of Ni of the user time when a player request occurs is obtained by counting down reference time (Th from automatic selection start to game start) sent from the synchronous control unit 150 as time elapses, and can be returned in response to the player request.

The synchronous control unit 150 transfers a timing of player selection processing to the player selection processing unit 140 for every predetermined cycle to start the automatic selection unit 141. When the automatic selection unit 141 is started, the synchronous control unit 150 transfers the reference value "Tf+Tg" of the player request residual time ta to the player selection processing unit 140. Further, when automatic selection processing is started, the synchronous control unit 150 transfers the reference value Th of the residual time tb until a game is started, to the player selection processing unit.

Figure 4:
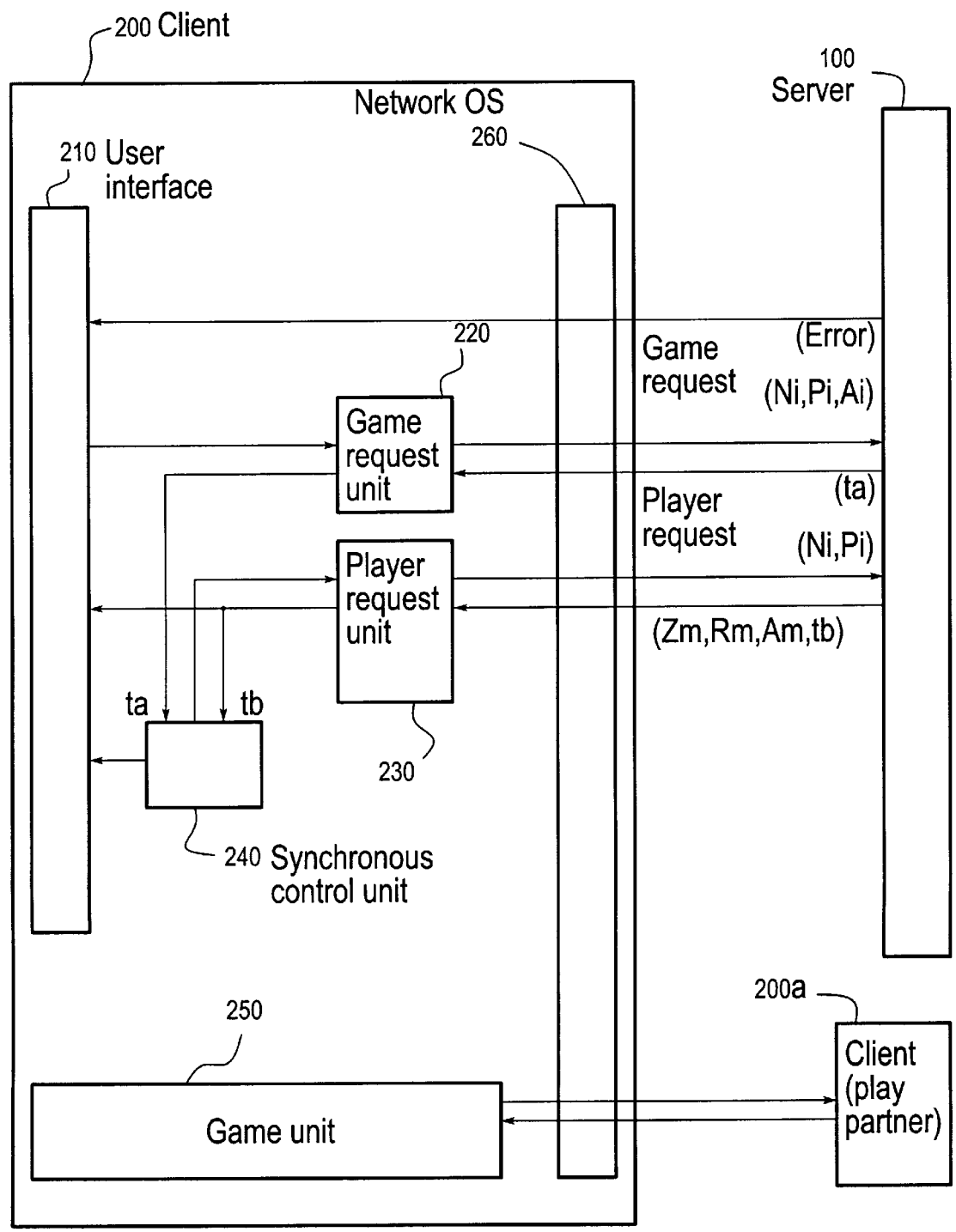
FIG. 4 shows the internal configuration of a client.

FIG. 4 shows the internal configuration of the client 200.

A user interface 210 plays roles of information input from users and presenting information to users. The user interface 210 will be described in detail, using an example of application of the present invention to a shogi game.

Figure 5:
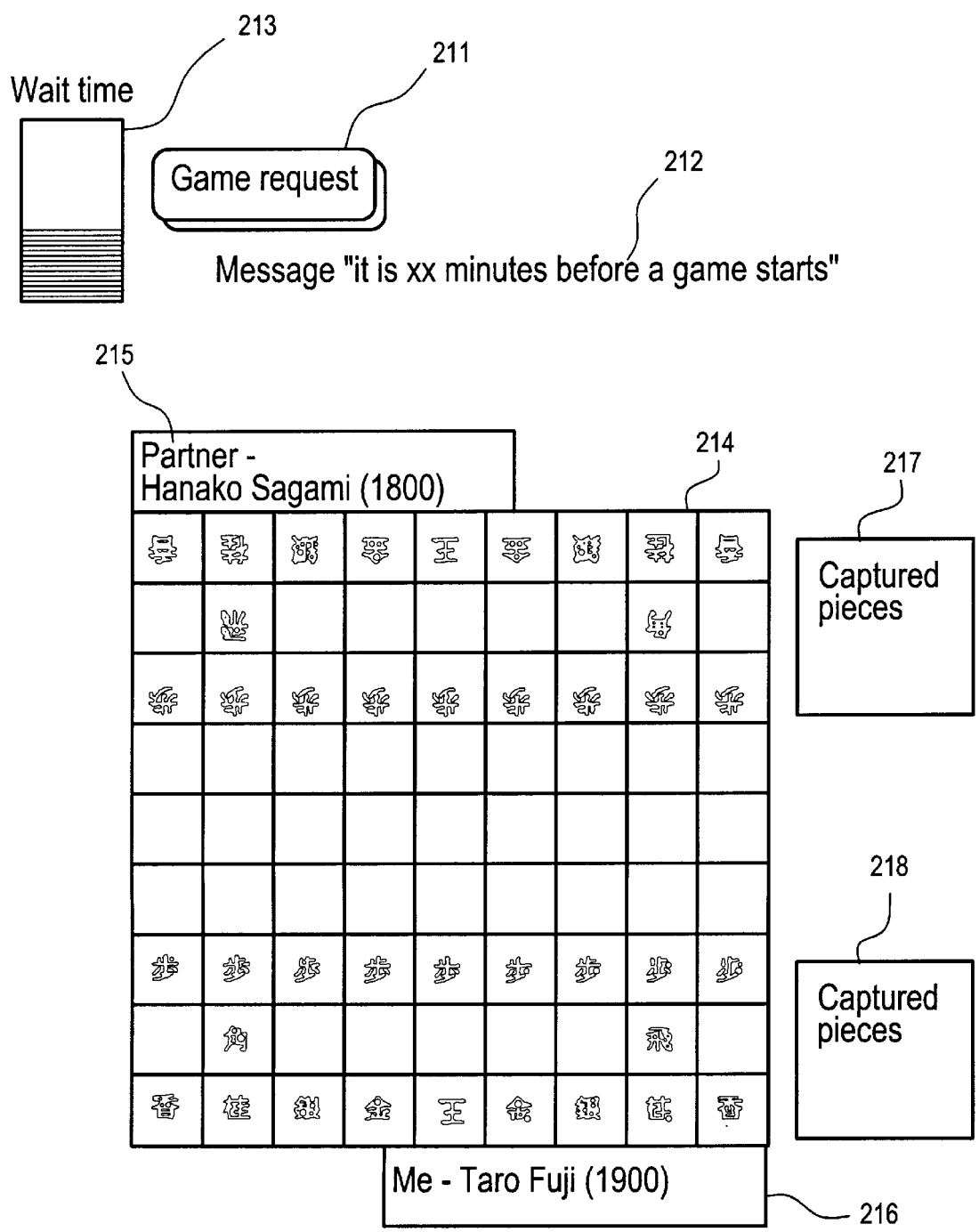
FIG. 5 shows an example of a user interface.

FIG. 5 shows an example of the user interface 210. The user interface 210 is provided with a game request button 211, and clicking on the game request button 211 by a mouse transfers a game request indication to the game request unit 220. Below the game request button 211 is a message display device 212. The message display device 212 displays a variety of messages to be reported to users. For example, when an error message is returned in response from the server 100, the error message is displayed. To the left of the game request button 211 is a gauge 213. The gauge 213 displays wait time until a game starts. At the center of the screen is a shogi board display device 214, which displays the status of a game. Above and below the shogi board display device 214 are player display devices 215 and 216. The upper player display device 215 displays the name and level of a play partner. The lower player display device 216 displays the name and level of a user. The player display device 215 can also display a partner's address. In this case, communication with a play partner can be established using the displayed address to play the game. To the right side of the shogi board display device 214 are captured piece display devices 217 and 218, which display the captured pieces of a partner and the captured pieces of a user, respectively.

Referring back to FIG. 4, on receiving a game request from the user interface 210, the game request unit 220 adds the user identifier Ni, password Pi, and address Ai as a game request protocol, and sends them to the server 100. If an error message (Error) is returned as a response, it is displayed on the user interface 210. If the player request residual time ta is returned as a normal response, it is reported to the synchronous control unit 240.

A player request unit 230 obtains a player request timing from a synchronous control unit 240 and issues a player request protocol to the server 100. If player information Zm, the level Rm of a play partner, the address Am of an opposing player, and the game start residual time tb are returned from the server 100, the player request unit 230 passes the player information Zm and the level Rm and address of the play partner to the user interface 210 and sends the game start residual time tb to the synchronous control unit 240.

The synchronous control unit 240 receives the player request residual time ta and game start residual time tb from the game request unit 220 and the player request unit 230, respectively, counts them down, and displays them on the message display device 212 of the user interface 210 and the like. If the game request residual time ta becomes 0, the synchronous control unit 240 commands the player request unit 230 to issue a player request to the server 100.

A game unit 250 plays with a specific partner (here, a user of client 200a) through a network. That is, the game unit 250 tells user's moves to a client 200a of a partner and receives partner's moves, and reflects the results of moves on the shogi board display device 214. The game unit 250 can be whatever actually enables a game by specifying a partner's IP address.

Like the network OS 110 of the server 100, a network OS 260 is a device on which TCP/IP, HTTP, and the protocols of this system operate.

In the network game system configured as described above, processing described below is performed.

Here, a description will be made noting one client 200 connected to a network. When the client 200 issues a game request to the server 100, player request residual time ta is returned from the server 100. When the player request residual time ta elapses, the client 200 automatically issues a player request to the server 100. Automatic selection of players is cyclically performed, so that, when the player request is issued from the client 200, automatic selection of opposing players for users waiting for a game has already terminated. By this process, information about a selected opposing player is returned from the server 100 to the client 200. At this time, game start residual time tb is also returned at the same time. After the game start residual time tb elapses, the client 200 starts a game with the selected opposing player. Since a client of the partner also performs the same processing, the game can be started at the same time.

By performing these processes repeatedly, synchronization between a server and a client, and between clients can be achieved.

Figure 6:
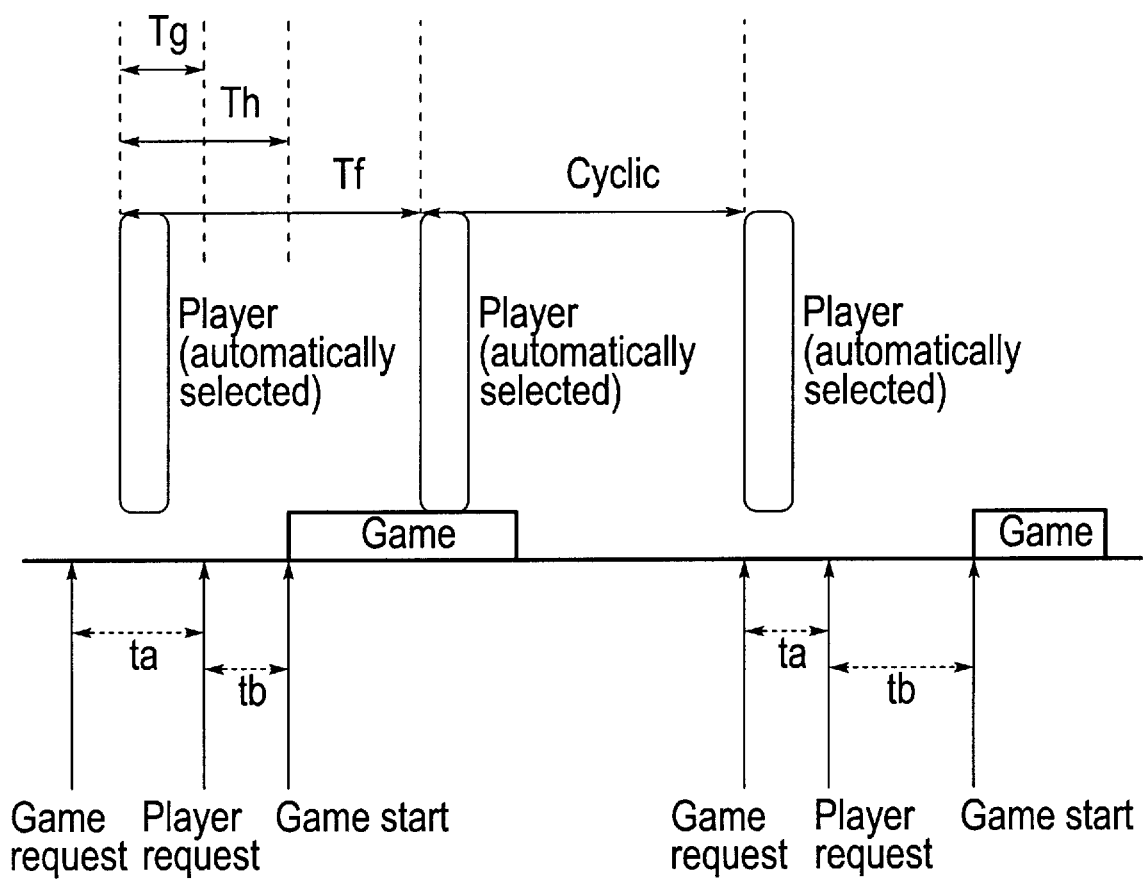
FIG. 6 shows the status of synchronization between a server and a client.

FIG. 6 shows the status of synchronization between a server and a client. The horizontal axis of the figure indicates time. In the figure, constants Tg, Th, and Tf are shown. Tg is time greater than or equal to time required for automatic selection of opposing players to terminate. Th is time from when automatic selection is started to when a game is started. Tf is a cycle time of automatic selection processing cyclically repeated. These are determined in advance. The player request time ta and game start residual time tb at the time of automatic selection processing can be calculated using these constants as follows.
[Expression 1]

$$ta \leftarrow Tf+Tg, \ tb \leftarrow Th \quad (1)$$

To describe detailed operation of this system, the operation of server 100 and client 200 is shown in FIGS. 7 to 16. Processes shown in these flowcharts will be described according to step numbers.

Figure 7:
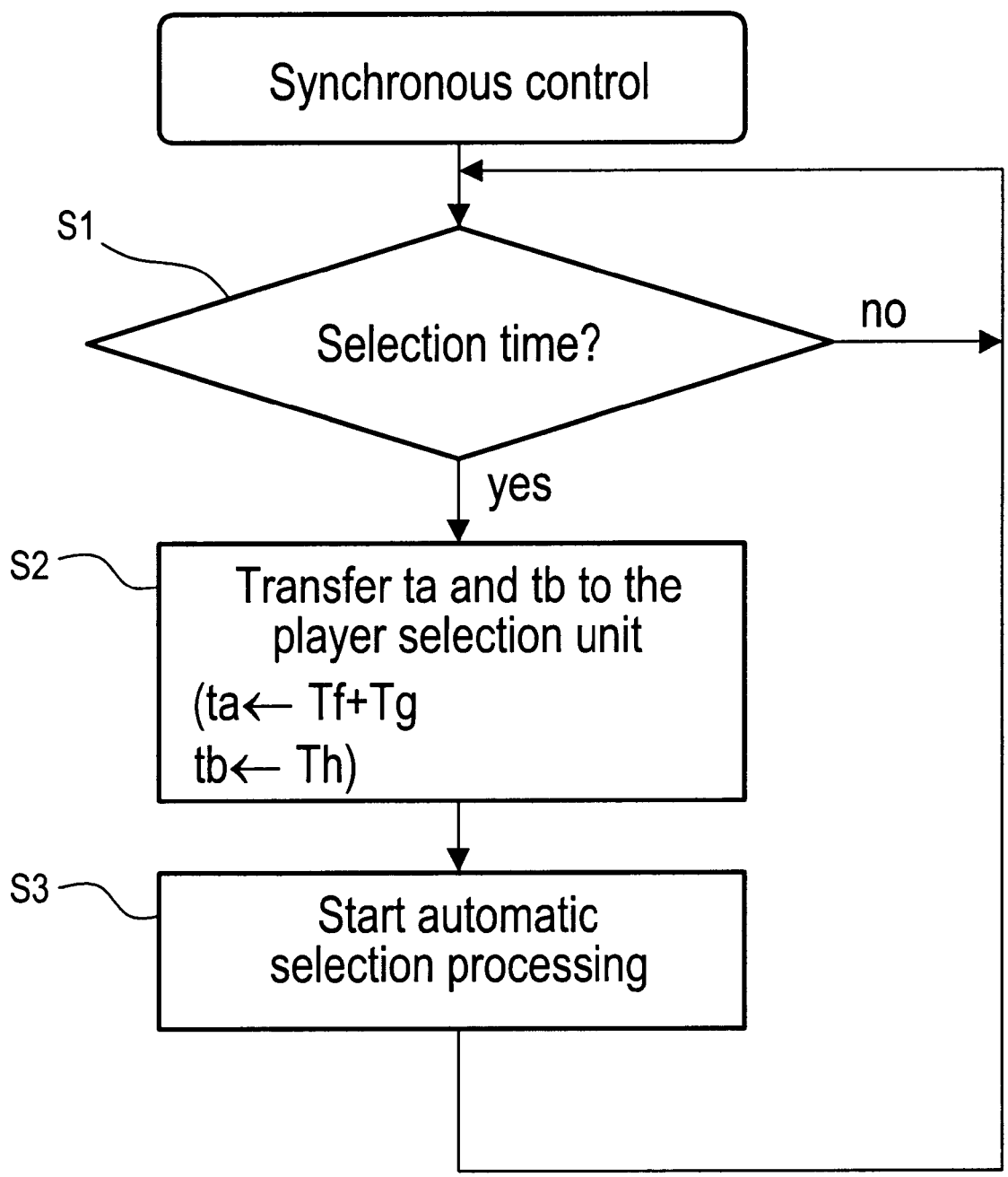
FIG. 7 is a flowchart showing synchronous control processing in a server.

FIG. 7 is a flowchart showing synchronous control processing in the server. All the processing shown in the flowchart is performed in the synchronous control unit 150.
[S1] With selection time set cyclically and repeatedly, it monitors at all times whether the selection time is reached. If the selection time is reached, it proceeds to a step S2. Otherwise it repeats processing of the step S1.
[S2] It acquires the player request residual time ta and game start residual time tb by the expression (1) and transfers them to the player selection processing unit 140.
[S3] It starts automatic selection processing and returns to the step S1.

By these processes, synchronous processing of the server 100 is performed.

In the network OS 110 and the authentication unit 120, receive processing is performed.

Figure 8:
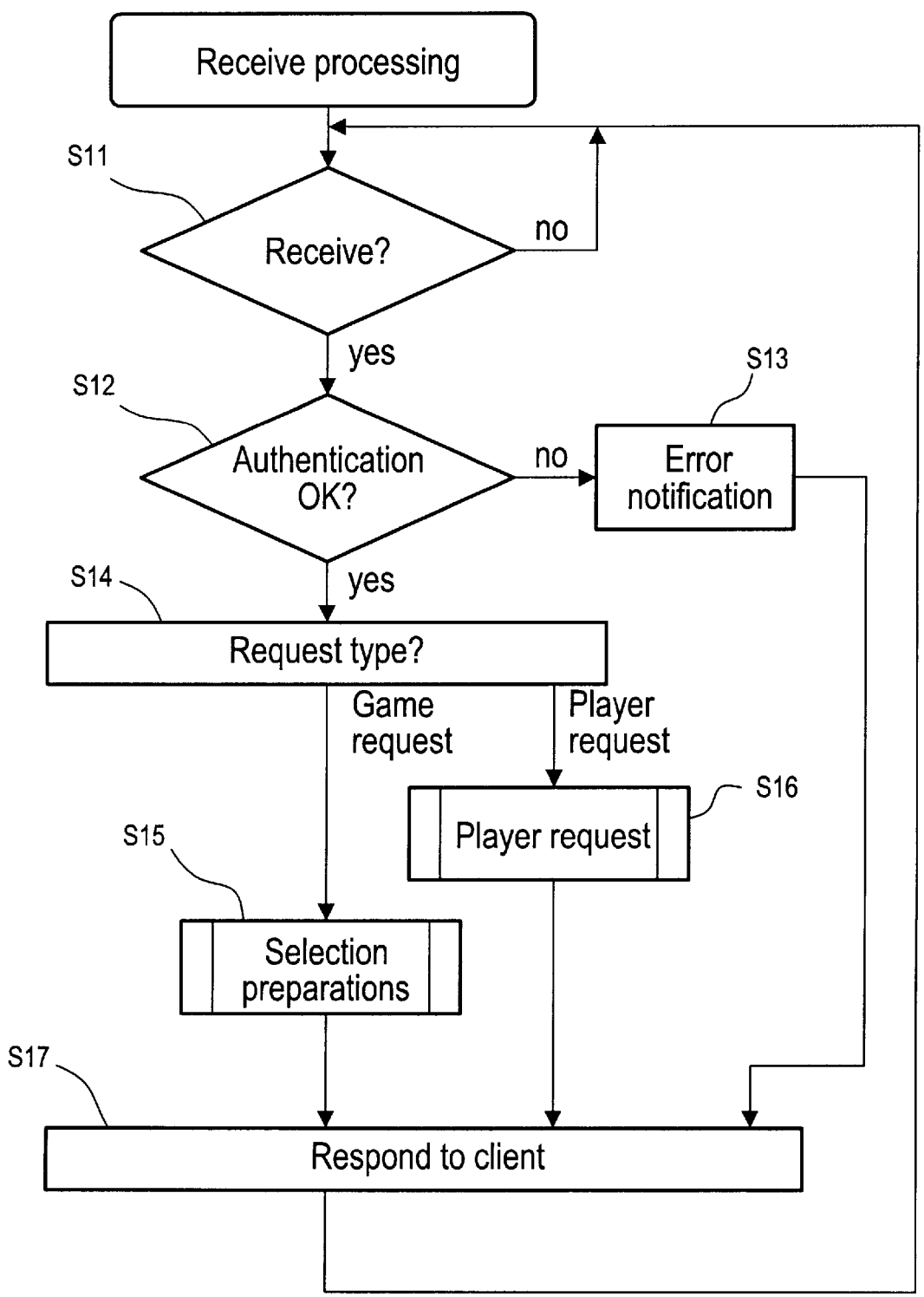
FIG. 8 is a flowchart showing receive processing of a server.

FIG. 8 is a flowchart showing receive processing of the server.
[S11] The network OS 110 always determines whether a signal is received. If a signal is received, proceeds to a step S12. Otherwise repeats processing of the step S11.
[S12] The authentication unit 120 authenticates whether the signal is issued by a legitimate user. This can be achieved by comparison with a pair of user identifier and password in the user DB 130. For an illegitimate user, it proceeds to a step S13, and for a legitimate user, it proceeds to a step S14.
[S13] If the received signal is issued from an illegitimate user, the authentication unit 120 generates a message indicating an error and proceeds to a step S17.
[S14] If the received signal is issued from a legitimate user, the authentication unit 130 determines the type of a received request. If the request is a game request, it proceeds to a step S15, and if the request is a player request, it proceeds to a step S16.
[S15] The player selection 140 performs selection preparation processing and proceeds to the step S17. Details of this processing are given later.

[S16] The player selection processing unit 140 performs player request processing and proceeds to step S17. Details of this processing are given later.

[S17] At termination of each process step, the network OS 110 returns processing results to a requesting client and prepares for the next reception.

Figure 9:
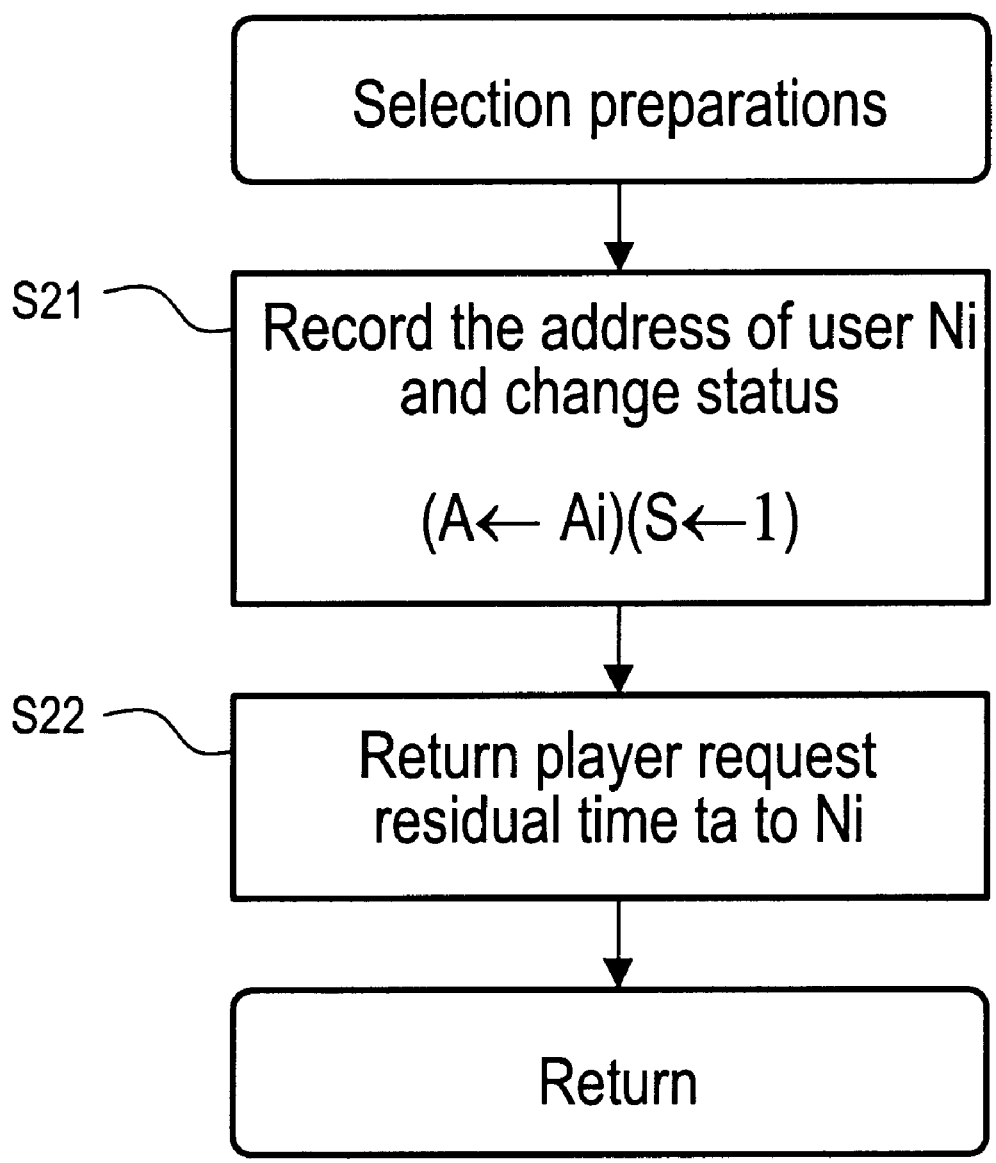
FIG. 9 is a flowchart showing a selection preparation subroutine.

FIG. 9 is a flowchart showing a selection preparation subroutine. This processing is performed by the player selection processing unit 140 when a game request occurs.

[S21] It records the address of requesting user Ni and sets game-standby status (S←1).

[S22] It returns the player request residual time ta at that point to user Ni. A packet is actually created by the network OS 110 (hereafter, packets are always created by the network OS 110).

Figure 10:
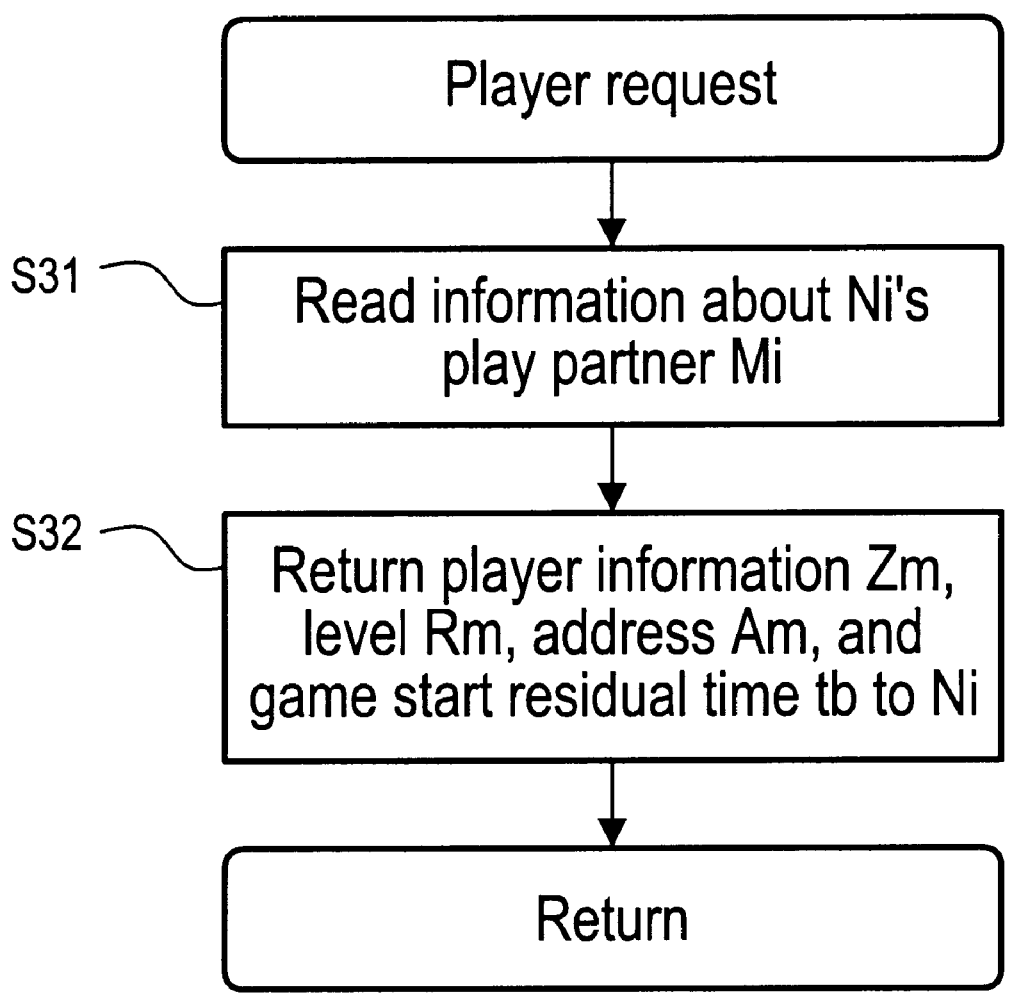
FIG. 10 is a flowchart showing a player request subroutine.

FIG. 10 is a flowchart showing a player request subroutine. This processing is performed by the player selection processing unit 140 when a player request occurs. [S31] It gets the play partner Mi of requesting user Ni from the user DB 130.

[S32] It returns the game start residual time tb to the requesting user Ni along with user information, a level, and address information which are obtained using the gotten play partner Mi as a user identifier.

Figure 11:
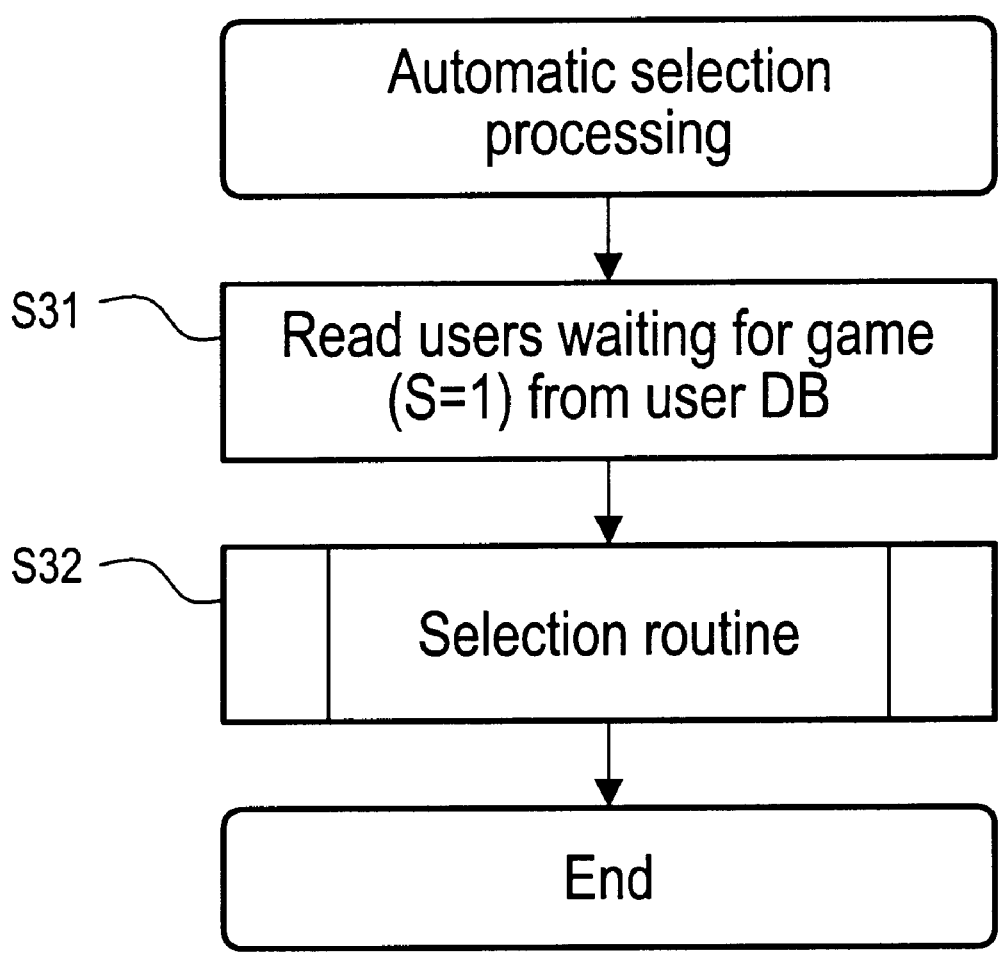
FIG. 11 is a flowchart showing automatic selection processing.

FIG. 11 is a flowchart showing automatic selection processing. This processing is performed by the automatic selection function unit 141 when the synchronous control unit 150 starts the automatic selection function unit 141 of the player selection processing unit 140.

[S41] First, it gets users waiting for a game from the user DB 130.

[S42] It executes a selection routine by a predetermined method, and stores obtained player Mi and game history Li in the user DB 130 for each user Ni.

Several methods are available to execute the selection routine. One of them will be described below.

Figure 12:
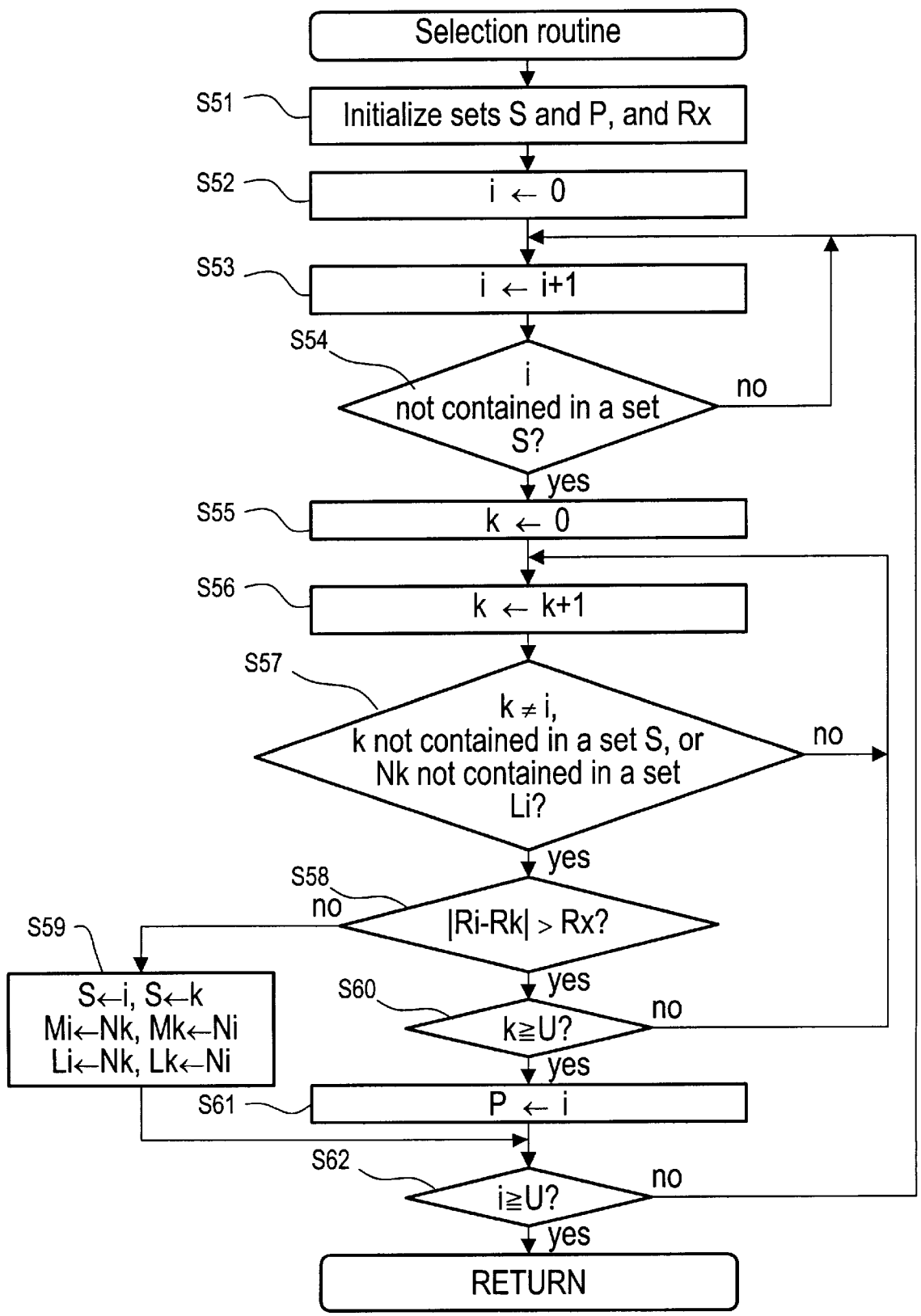
FIG. 12 is a flowchart showing a selection routine.

FIG. 12 is a flowchart showing a selection routine. [S51] It initializes sets S and P (makes them empty) and initializes (sets) reference value Rx. A set S is a set of processed item numbers and a set P is a set of item numbers that were processed but no partner was found.

A reference value Rx indicates reference of differences of levels permissible for selection as players. If the difference between the levels of two users falls within this range, the users are selected as players. Variables used in this processing will be described using Table 3.

TABLE 3

| Item No. | Identifier N | Level R | Player M | Player history L |
|---|---|---|---|---|
| 1 | abc | 2000 | def | ghi, jkl, def |
| 2 | def | 2100 | abc | mno, pqr, abc |
| 3 | ghi | 1800 | xyz | abc, xyz |
| ... | | | | |
| U | xyz | 1900 | ghi | stu, ghi |

In Table 3, item numbers begin with a number 1 and end with the number (U) of users waiting for a game. Hereinafter, the item number will be used as a suffix. Namely, a user identifier of an item number of 2 is N2. The identifier N, level R, player M, and player history L are the same as used in the user DB 130.

[S52] It initializes the value "i" of an item number selected to 0.

[S53] It adds 1 to the value of "i."

[S54] It determines whether "i" is contained in a set S. If it is contained in the set S, since the play partner of a user corresponding to the item number is already determined, it returns to a step S53. If not contained in the set S, it proceeds to a step S55.

[S55] It initializes the value "k" of an item number with which to compare to 0.

[S56] It adds 1 to the value of "k."

[S57] It determines whether a user of item number "k" satisfies basic conditions as a play partner. As a basic condition, the relevant user himself is excluded (i≠k). Additionally, item numbers (contained in the set S) already processed, and users (contained in a set Li) with whom a game was already played within a predetermined period or a predetermined number of games are excluded from selection. If these conditions are satisfied, it proceeds to a step S58. Otherwise it proceeds to the step S56.

[S58] It determines whether the difference between the level of user of item number "i" and the level of user of item number "k" is greater than or equal to Rx (|Ri−Rx|>Rx). If the difference between the levels is not greater than Rx, it proceeds to a step S59. Otherwise it proceeds to step S60.

[S59] It includes item numbers "i" and "k" in the set S containing processed item numbers. It registers identifier "Nk" of item number "k" in player "Mi" of item number "i" and identifier "Ni" of item number "i" in player "Mk" of item number "k." Further, it registers identifier "Nk" of item number "k" in player history "Li" of item number "i" and identifier "Ni" of item number "i" in player history "Lk" of item number "k." Upon termination of these settings, it proceeds to a step S62.

[S60] It determines whether item number "k" compared is greater than or equal to the maximum value of item number. If "k" is greater than or equal to "U", it proceeds to step S61. Otherwise it returns to the step S56.

[S61] It includes item number "i" in the set P. Namely, a proper opposing player of a user of item number "i" was not found.

[S62] It determines whether item number "i" selected is greater than or equal to the maximum value "U" of item number. If "i" is greater than or equal to "U", it terminates processing. Otherwise it returns to the step S53.

By this process, users having a level difference up to Rx are selected for each of users of item numbers from 1 to U. Alternatively, combinations may be selected which allow the average of |Ri−Rk| to be minimized by rearranging the users. Further, Rx may also be increased so that the set P becomes empty.

Processing performed in the server 100 is as described above. Next, the operation of the client will be described.

Figure 13:
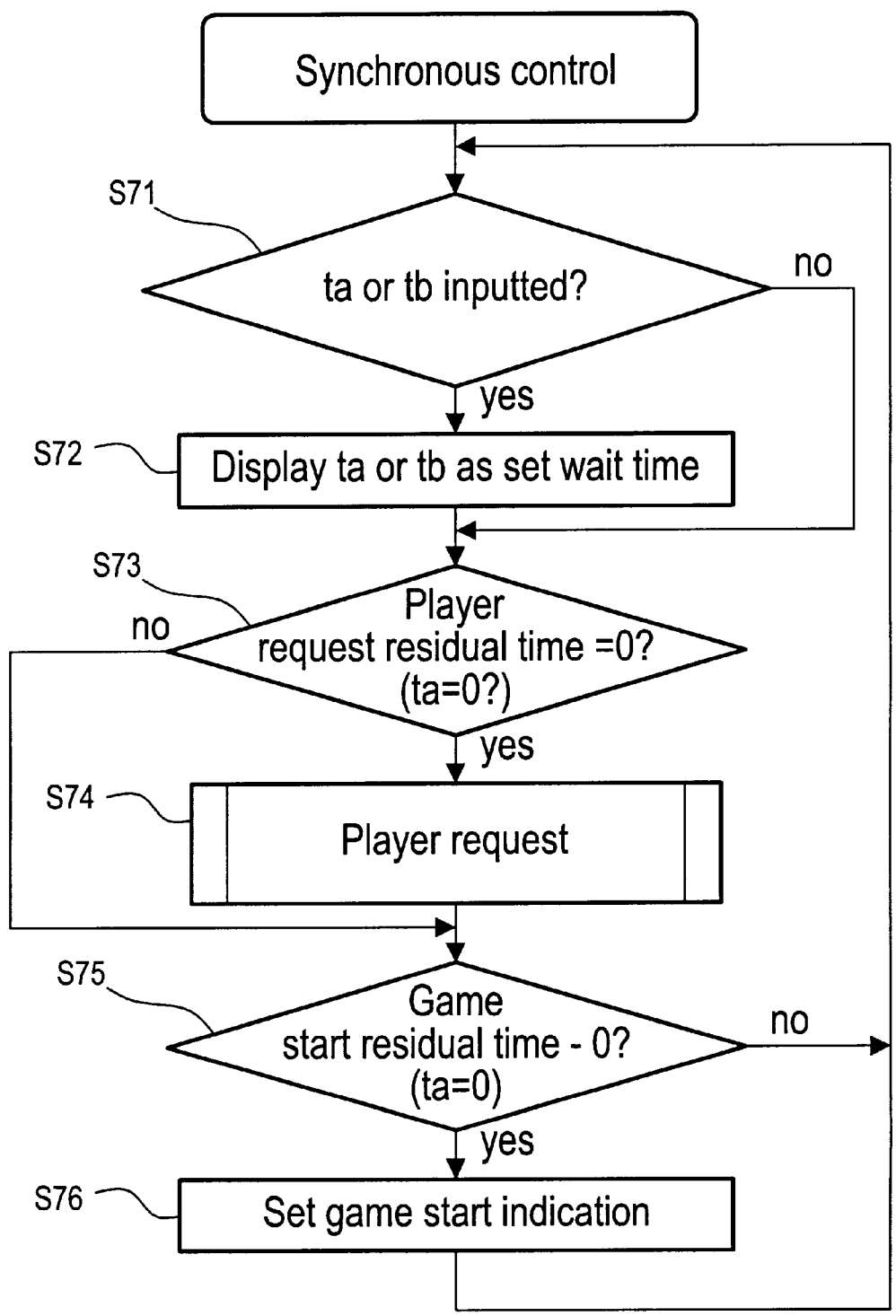
FIG. 13 is a flowchart showing synchronous control processing of a client.

FIG. 13 is a flowchart showing synchronous control processing of client. This processing is performed by the synchronous control unit 240 within the client 200.

[S71] It monitors at all times whether the player request residual time ta or game start residual time tb is inputted from the game request unit 220 or player request unit 230, respectively. If they are inputted, it proceeds to a step S72. Otherwise it proceeds to a step S73.

[S72] If the player request residual time ta or game start residual time tb is inputted, it sets the time as an initial value and counts it down. It displays the elapsed time as wait time on the user interface 210.

[S73] It determines whether the player request residual time ta is 0. If it is 0, it proceeds to step S74. Otherwise it proceeds to a step S75.

[S74] If the player request residual time ta becomes 0, commands the player request unit 230 to issue a player request to the server 100.

[S75] Determines whether the game start residual time tb is 0. If it is 0, it proceeds to a step S76. Otherwise it proceeds to S71.
[S76] If the game start residual time tb is 0, it displays game start on the user interface 210 and returns to the step S71.

Through these steps, the user starts a game using the game unit 250 provided separately.

Figure 14:
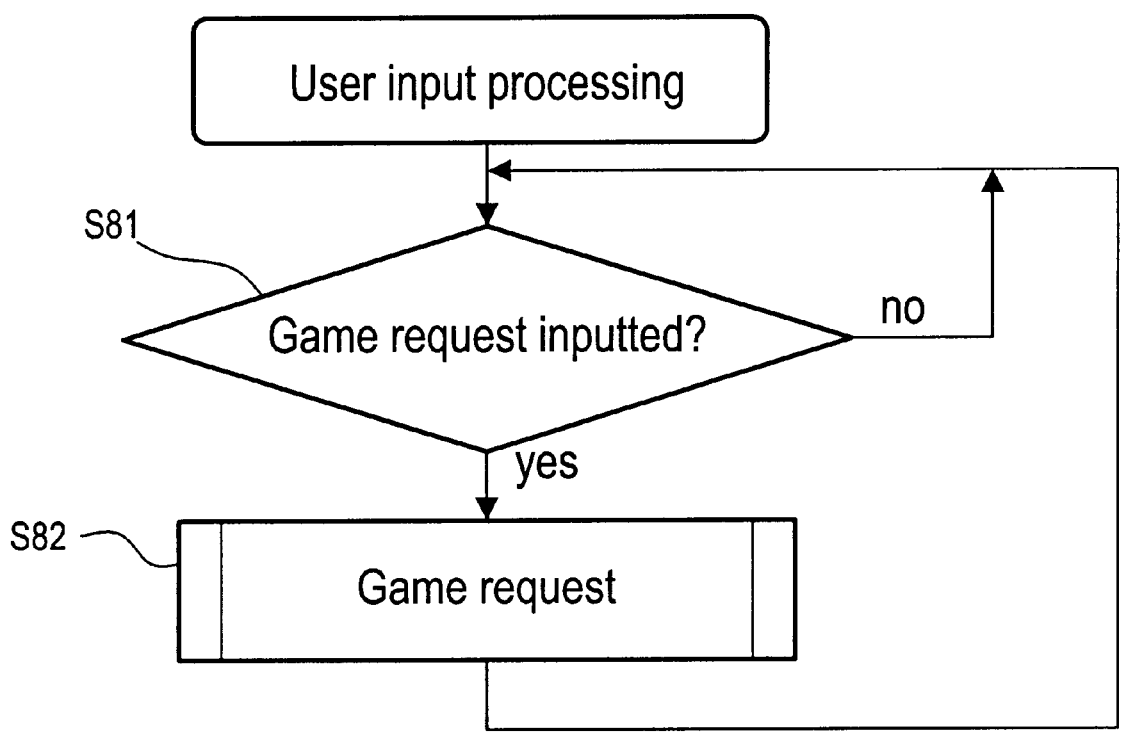
FIG. 14 is a flowchart showing user input processing.

FIG. 14 is a flowchart showing user input processing. This processing is performed in the user interface 210.
[S81] It monitors whether a game request is inputted. In the basic configuration, it monitors input of the game request button 211 because only it is provided as an input button. If the game request button 211 is clicked, it proceeds to a step S82. Otherwise it repeats this step.
[S82] If the game request button 211 is clicked, it commands the game request unit 220 to issue a game request.

Figure 15:
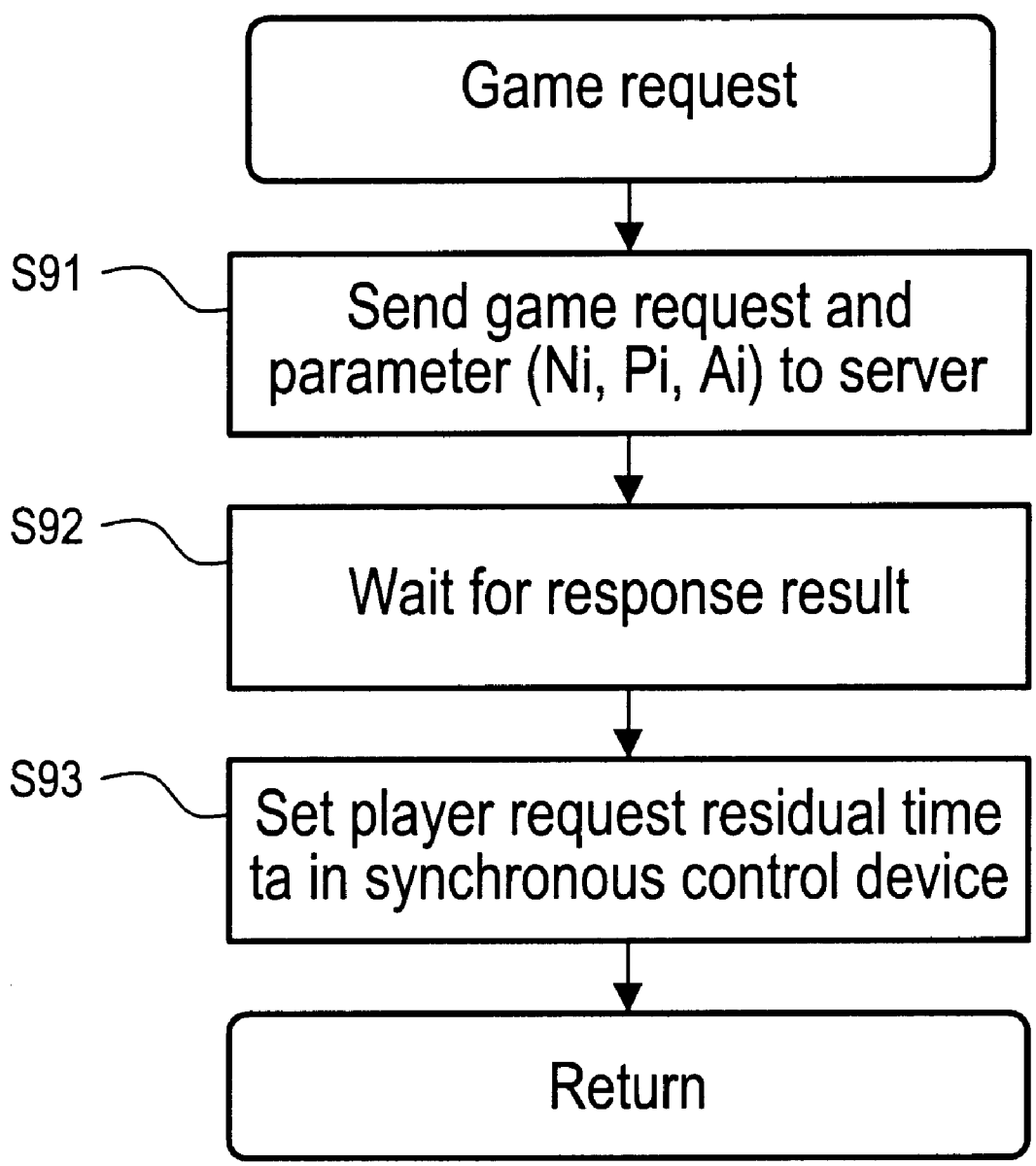
FIG. 15 is a flowchart showing a game request subroutine.

FIG. 15 is a flowchart showing a game request subroutine. This processing is performed in the game request unit 220.
[S91] It includes the user identifier Ni, password Pi, and address Ai in a game request protocol and sends it to the server. Since the address is set in advance in the client 200, even if the user does not input it, it can be automatically detected and put on a protocol.
[S92] It waits that a response to the game request is returned.
[S93] If a response is returned, it sets player request residual time ta in the synchronous control unit 240.

Figure 16:
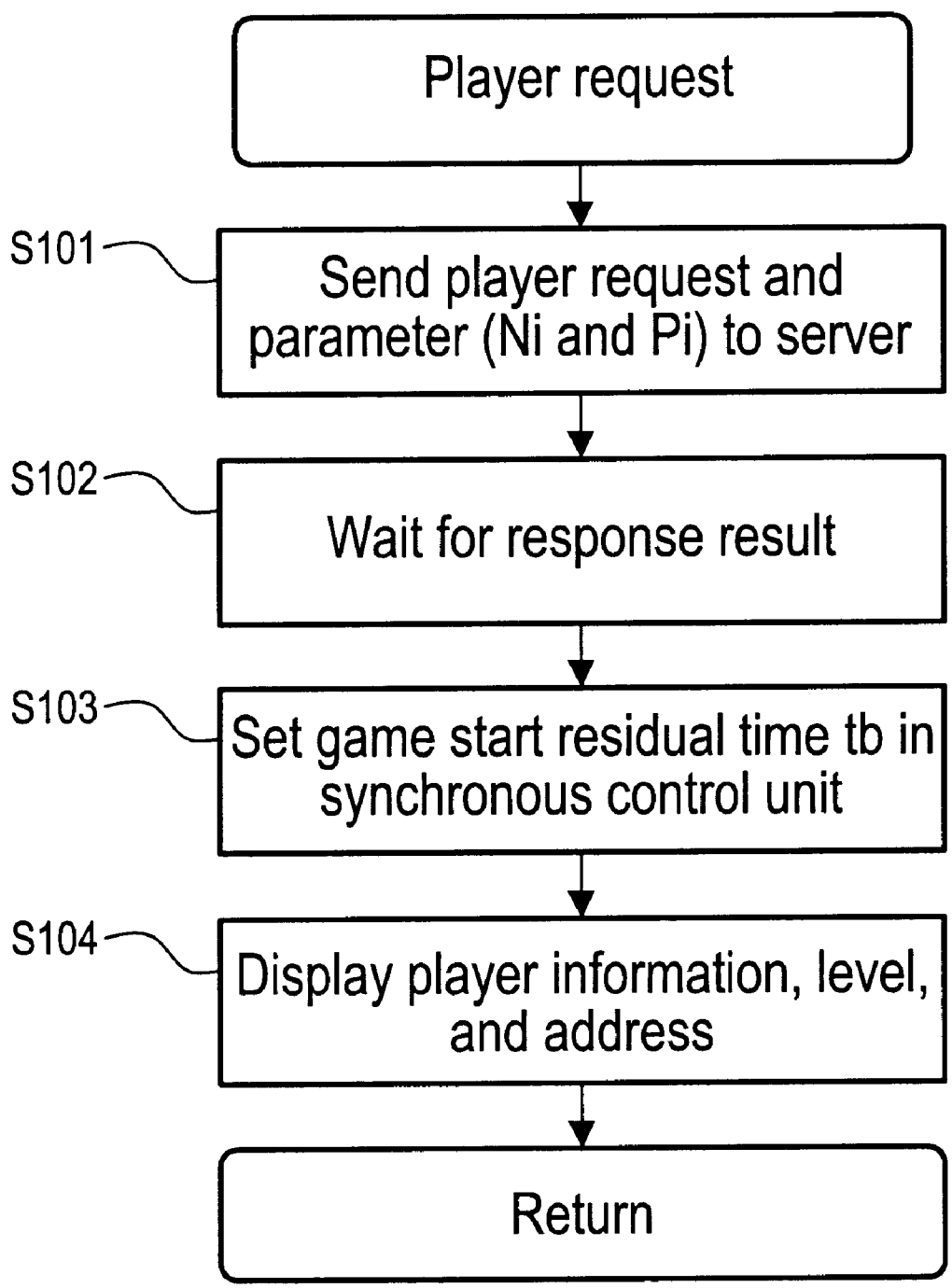
FIG. 16 is a flowchart showing a player request subroutine.

FIG. 16 is a flowchart showing a player request subroutine. This processing is performed in the player request unit 230.
[S101] It includes the user identifier Ni and password Pi in a player request protocol and issues it to the server 100.
[S102] It waits for a response to the player request.
[S103] If a response is returned, it sets game start residual time tb of the response in the synchronous control unit 240.
[S104] It displays user information, a level, and an address contained in the response on the user interface 210.

The operation of client is as described above.

In this way, the partner of a user wishing to play is automatically determined by the server 100 and information about the play partner can be sent to a client the user is using. As a result, the user is freed from efforts to find play partners by himself.

Also, since the system provides synchronization for player selection, the selection range of play partners is expanded and the user is freed from monitoring at all times whether selection results are produced.

Further, since the system provides synchronization to start a game, players need not establish contact with each other to provide timing for starting a game. Also, since users' network addresses (or telephone numbers) are contained in the user DB 130 and sent to play partners, users need not consult the destinations of play partners by themselves.

Next, a description will be made of a second embodiment with various application functions added to the above-mentioned basic configuration.

Table 4 lists protocols between a server and clients, used in the second embodiment.

TABLE 4

| Classification | Protocol | Request parameter | Result parameter | Description |
| --- | --- | --- | --- | --- |
| Basic | Game request | N, P, A | ta | Inquires about opposing players. |
| | Player request | N, P | Zm, Rm, Am, tb | Automatically issued by a client. |
| Application | Admission | N, P | (Menu) | First issued by users to enter the system. |
| | Exit | N, P | | Users exit from the system. |
| | End | N, P | | Users report that the game has terminated. |
| | Player rerequest | N, P | Zm, Rm, Am, tb | Requests change of opposing player. |
| | Display | N, P (data kind specification) | (Data) | Requests displaying desired data. |

Parameter added for the application protocols
tc: Game start residual time (difference between new-game start time and current time)
Note: All protocols described above are sent from clients to a server and the results are returned from the server to the clients.

In this embodiment, protocols are classified as "basic" and "application." The protocols used in the first embodiment are basic protocols and protocols newly defined to implement this embodiment are application protocols. The basic protocols include only the game request and player request, while the application protocols include five types of protocols, in addition to the basic protocols.

"Admission" is a protocol first issued to the server by users to enter the system. The server, as a result, returns a service menu provided by the system. Accordingly, only legitimate users can gain access to services of the system.

"Exit" is a protocol for users to exit from the system. The exit protocol, combined with the admission protocol, allows users to gain access only in a time period from admission to exit, thereby providing high security for the system.

"End" is a protocol indicating that a game has terminated. This protocol allows the server to immediately use the results of the game to calculate the level of an opposing player.

"Player rerequest" is a protocol issued when a user wants to change a selected play partner. Although the server returns the same results as for a player request, the value of game start residual time tc in this case is different from game start residual time tb for a player request.

"Display" is a protocol for requesting the display of information of a user DB.

Figure 17:
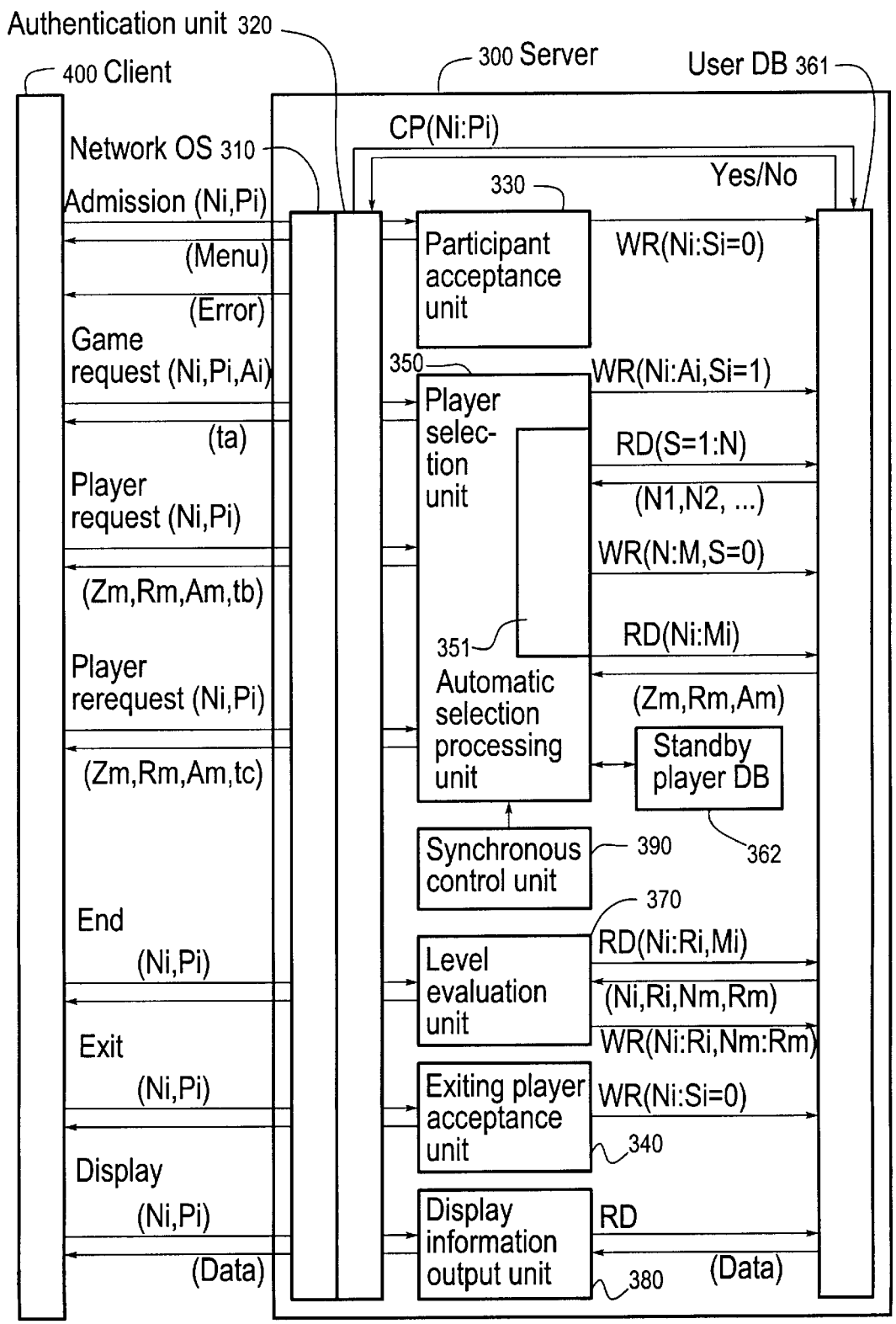
FIG. 17 illustrates the configuration of a server of a second embodiment of the present invention.

FIG. 17 illustrates the configuration of a server of the second embodiment of the present invention. The server 300 is connected through a client 400 and a network.

The network OS 310 can recognize all protocols in Table 4. The authentication unit 320 is the same as already described with the basic configuration (authentication unit 120 shown in FIG. 3).

A participant acceptance unit 330 receives an admission protocol from a client 400, initializes (S=0) the status of requested user Ni, and returns a service menu of the system to the client 400. Although even illegitimate users are permitted access in the basic configuration described in the first embodiment, only legitimate users are permitted to make access by using this function. As a result, the load on the server can be reduced.

An exiting player acceptance unit 340 is used in pairs with the above-mentioned participant acceptance unit 330. When an exit request arrives, the exiting player acceptance unit 340 initializes (S=0) the status of the user and closes the service menu.

In addition to the functions of basic configuration, a player selection processing unit 350 includes the function to find an opposing player using a standby player DB 362 for the sake of a user whose play partner was not found in the user DB 361, and the function to process a player rerequest. Namely, there is the case where a user wants to change a play partner. In this case, the user can issue a player rerequest. On receiving this request, the player selection processing unit 350 selects an opposing player from the standby player DB 362 and returns it to the user. A basic flow from receipt of the protocol to processing is the same as for a player request. Details are given in the flowchart.

The user DB 361 stores data of users registered in advance, like the first embodiment. The contents of data are as shown in Table 2.

The standby player DB 362 is a database of users who are registered in advance and waiting for a player rerequest. The contents of data stored in the standby player DB 362 are the same as those of the user DB 361.

A level evaluation unit 370, when a game terminates, calculates the levels of the opposing players from the results of the game and the levels of the opposing players according to predetermined rules and updates the levels of users who played the game, in the user DB 361. The level evaluation unit 370 obtains the opposing player Mi of the user Ni who issued an end protocol, from the user DB 361 and gets the respective levels of a user and an opposing player from the user DB 361. The level evaluation unit 370 recalculates the levels and stores the results in the user DB 361.

One example of calculating players' levels is the rating method used to evaluate players' levels in shogi. In the rating method, a handicap point is calculated by the following expressions and is added to or subtracted from the original scores of winner and loser.
(1) When a player having a higher score wins Handicap point=16−(difference between assigned points×4%)
(2) When a player having a lower score wins Handicap point=16+(difference between assigned points×4%)

When a player having a higher score wins, if the difference between assigned points exceeded 400, a handicap point would become negative. In this case, the levels are not changed. However, when the difference between levels exceeds a predetermined threshold level, since no player is selected in processing of automatic selection of players, the difference between assigned points will not exceed 400 if the threshold level is set to 400 or less.

A display information output unit 380 has the function to return information of user DB 361 to a client 400. A password cannot be returned. On receiving a display request item from the client 400, the display information output unit 380 responds according to it.

A synchronous control unit 390 has the same function as that in the first embodiment. However, automatic selection is made cyclically in the first embodiment, while there may also be provided a mechanism in which the cycle is changed depending on the number of participants, the number of current players, and the number of persons waiting for a game so that the cycle of the next automatic selection of players is determined. When there are a small number of users waiting for a game, the game start residual time tb can be transferred to the client again as a response to the player request to extend the cycle.

Next, the configuration of a client corresponding to the above-mentioned server will be described.

Figure 18:
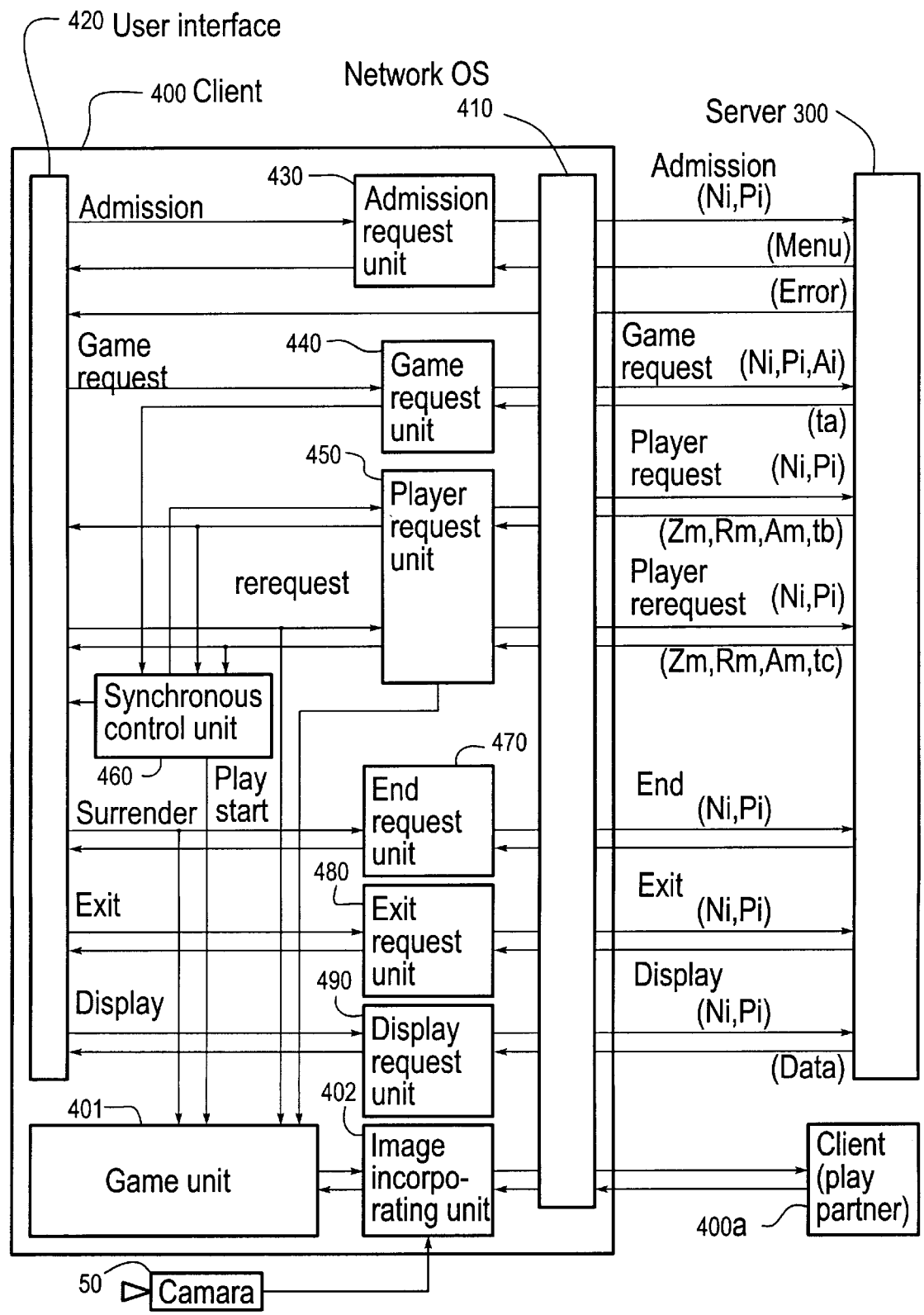
FIG. 18 shows the configuration of a client of the second embodiment.

FIG. 18 shows the configuration of a client of the second embodiment.

A network OS 410 can send and receive all protocols listed in Table 4.

A user interface 420 performs information input from and information display to users. The user interface 420 is a functional extension of the user interface in the first embodiment.

Figure 19:
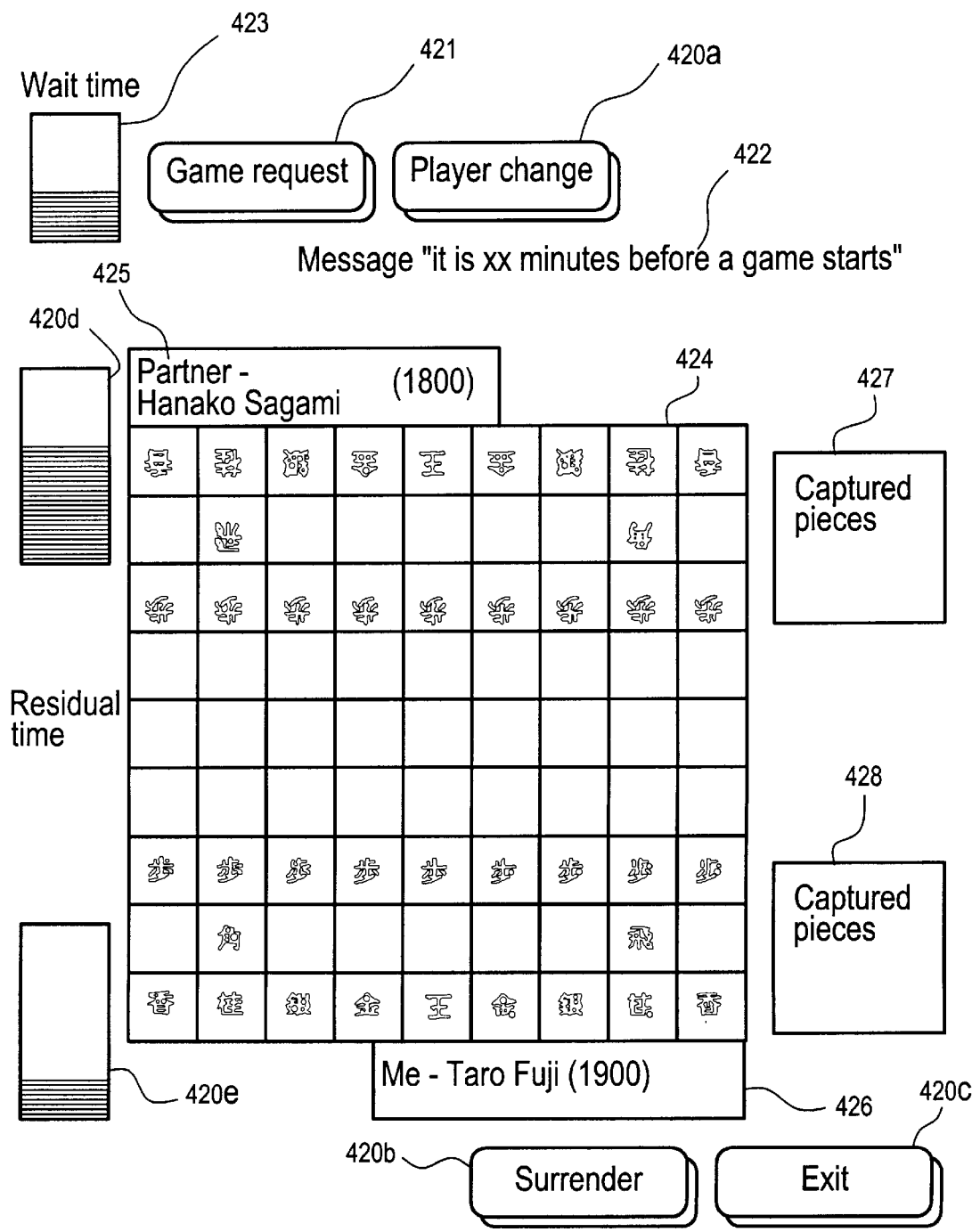
FIG. 19 shows an example of an extended user interface.

FIG. 19 shows an example of extended the user interface 420. A game request button 421, a message display device 422, a gauge 423, a shogi board display device 424, player display devices 425 and 426, and captured piece display devices 427 and 428 in the figure are the same as the components of the same names of the user interface 210 in the first embodiment shown in FIG. 5.

Input switches added in this embodiment are a player change button 420a, a surrender button 420b, and an exit button 420c. The player change button 420a is used when the user is not satisfied with opposing players selected by the server 300, and when this button is pressed, a player rerequest is issued. The surrender button 420b should be clicked when the user acknowledges loss, and when this button is clicked, an end command is outputted. The exit button 420c should be clicked when the use of services of the server 300 is terminated, and when this button is clicked, an exit command is outputted.

Residual time display devices 420d and 420e are added as a display function. The residual time display devices 420d and 420e indicate the residual amount of assigned time of each player in a game for which time is limited.

The user interface in FIG. 19 shows a screen after users have already participated. Before participation, an admission button (not shown) is provided. When the admission button is clicked, an admission request is outputted.

Referring back to FIG. 18, an admission request unit 430 sends an admission request from the user interface 420 to the server 300 and displays a response to it on the user interface 420. The user identifier Ni and password Pi are contained in the admission request sent to the server 300.

A game request unit 440 basically has the same function as the game request unit 220 (shown in FIG. 3) in the first embodiment.

A player request unit 450 has the function to transfer a player address Am returned from the server 300 to the game unit 401, in addition to the functions of the player request unit 230 (shown in FIG. 3) described in the first embodiment. When receiving player change input as a player rerequest, the player request unit 450 sends a player rerequest to the server 300 and waits for a response to it. On receiving a response, the player request unit 450 displays player information Zm and level Rm through the user interface 420, transfers the address Am to the game unit 401, and transfers the game start residual time tc to the synchronous control unit 460.

The above-mentioned player rerequest is transferred to the game unit 401 at the same time and can also be sent as a message indicating play rejection to a play partner.

In addition to the functions in the basic configuration, on receiving the game start residual times tb and tc from the player request unit 450, the synchronous control unit 460 displays wait time until game start on the user interface 420, and starts the game unit 401 when the game start time is reached.

On receiving surrender information (loss indication) from the user interface 420, an end request unit 470 tells the fact to the server 300 with an end protocol. The end request unit 470 waits for a response indicating normal processing from the server 300, and then displays a game end message on the user interface 420.

The above-mentioned surrender information is also transferred to the game unit 401 and in turn is also transferred to a play partner by the game unit 401.

An exit request unit 480 performs processing for users to exit from this system. It sends an exit protocol to the server 300, and on receiving a response, displays a processing completion message on the user interface 420.

A display request unit 490 selects user-desired information items, reads information about them from the server, and displays it.

The game unit 401 has the function to play a game with a client 400a of play partner, as possessed by the game unit 250 (shown in FIG. 3) described in the first embodiment, and the function to fetch various types of information from the processing function units within the client 400. On receiving an IP address from the player request unit 450, the game unit 401 can play with a player of the address. On receiving a player rerequest from the user interface 420, the game unit 401 transfers a play rejection indication to a play partner. On receiving game start residual times tb and tc from the synchronous control unit 460, the game unit 401 makes arrangements so that a game can be started mutually when the times are reached. On receiving an end protocol, the game unit 401 sends it to a play partner so that the partner can also recognize the end.

An image incorporating unit 402, in combination with the game unit 401 and camera 50, sends a move to a play partner along with a user's still image at the moment he made the move. A receiver of the same image displays the move and the still image on the screen. This arrangement provides increased reality for the game.

Figure 20:
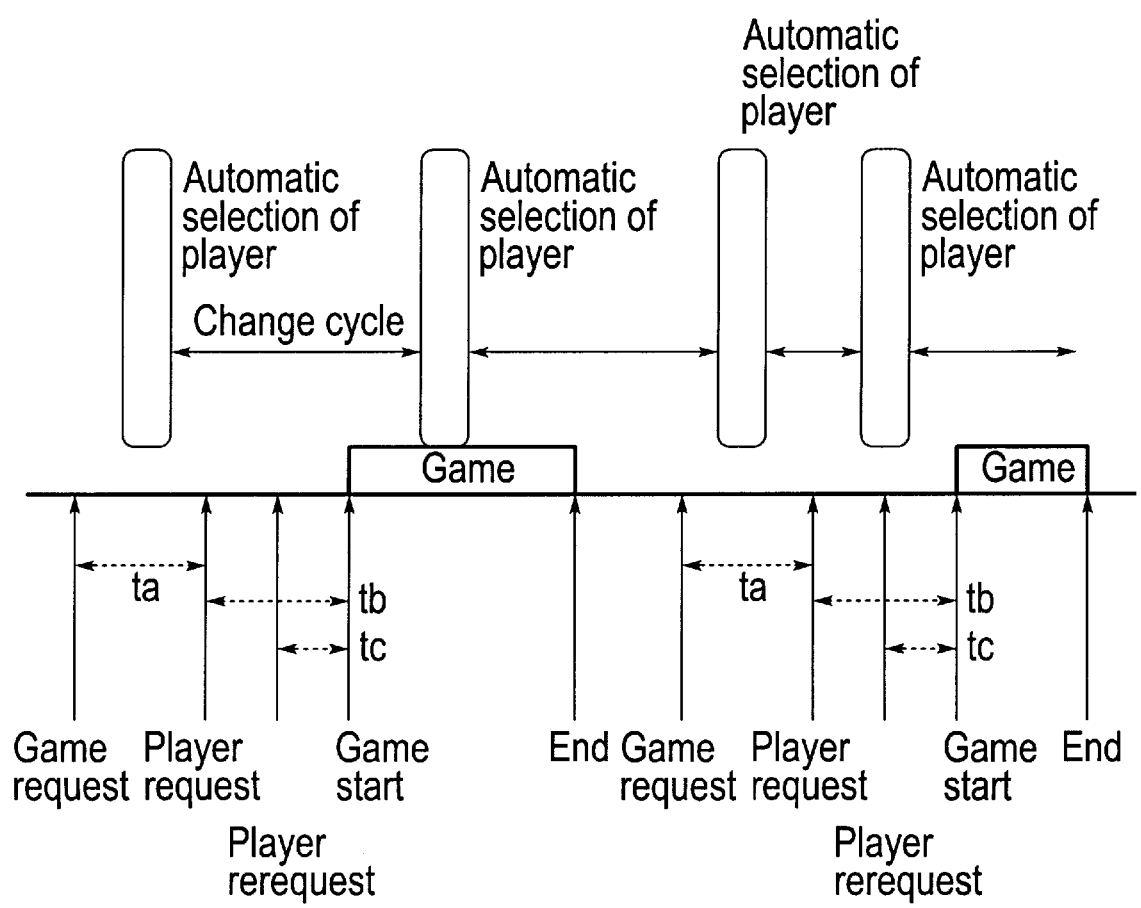
FIG. 20 shows the status of synchronization between a server and a client in the second embodiment.

FIG. 20 shows the status of synchronization between a server and a client in the second embodiment. In this figure, the horizontal axis is a time axis. A difference from the first embodiment (shown in FIG. 6) is that the game start residual time tc is determined according to a player rerequest and is returned as a response to the player rerequest. Automatic selection of players can be performed at a variable cycle, not at a predetermined cycle, and its behavior is shown in the figure.

The operation of this system will be described with reference to the flowcharts of the basic functions. FIGS. 21 to 35 show flowcharts of characteristic processing functions of the server 300 and client 400 of this system.

Figure 21:
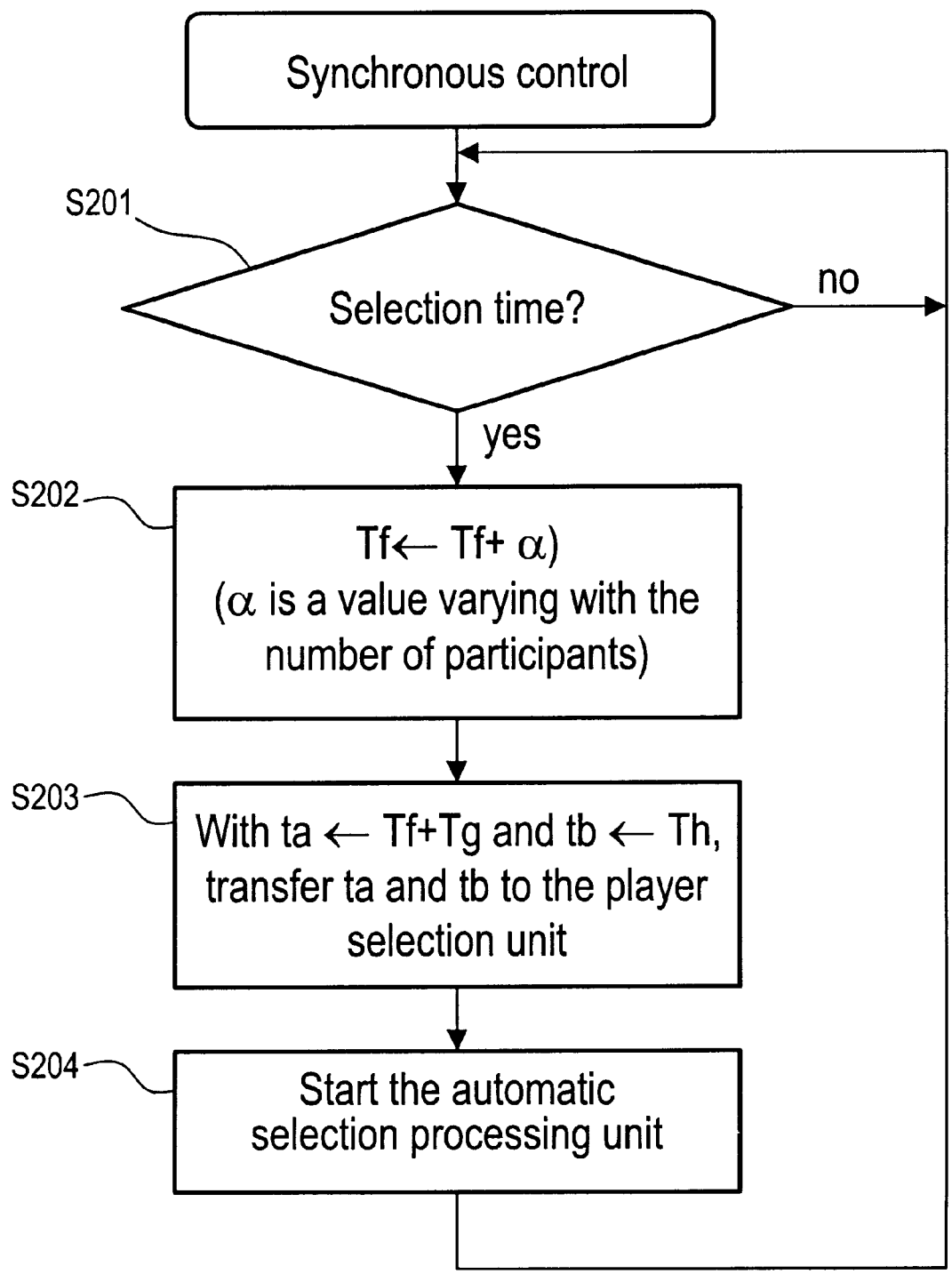
FIG. 21 is flowchart of synchronous control processing in a server.

FIG. 21 is a flowchart of synchronous control processing in the server. Although the same flowchart as that of the synchronous processing in the first embodiment is applicable, a flowchart when the cycle is variable is shown here. This processing is performed by the synchronous control unit 390.

[S201] Determines whether selection time is reached, and if so, proceeds to step S202, and if not so, repeats this step. By this process, whether selection time is reached is monitored at all times.

[S202] When selection time is reached, changes cycle Tf according to the current number of participants. Namely, in the expression shown below,

[Expression 2]

$$Tf \leftarrow Tf + \alpha (\alpha \text{ is a value varying with the number of participants.}) \quad (2)$$

the cycle Tf is calculated. If the number of participants is greater than usual, Tf is shortened, and if smaller, Tf is lengthened.

[S203] In the expression shown below,
[Expression 3]

$$ta \leftarrow Tf + Tg \quad tb \leftarrow Th \quad (3)$$

ta and tb are calculated and transferred to the player selection processing unit 350.

[S204] It starts automatic selection unit 351.
This is synchronous processing of the server 300.

Next, a description will be made of receive processing performed in the network OS 310 and the authentication unit 320.

Figure 22:
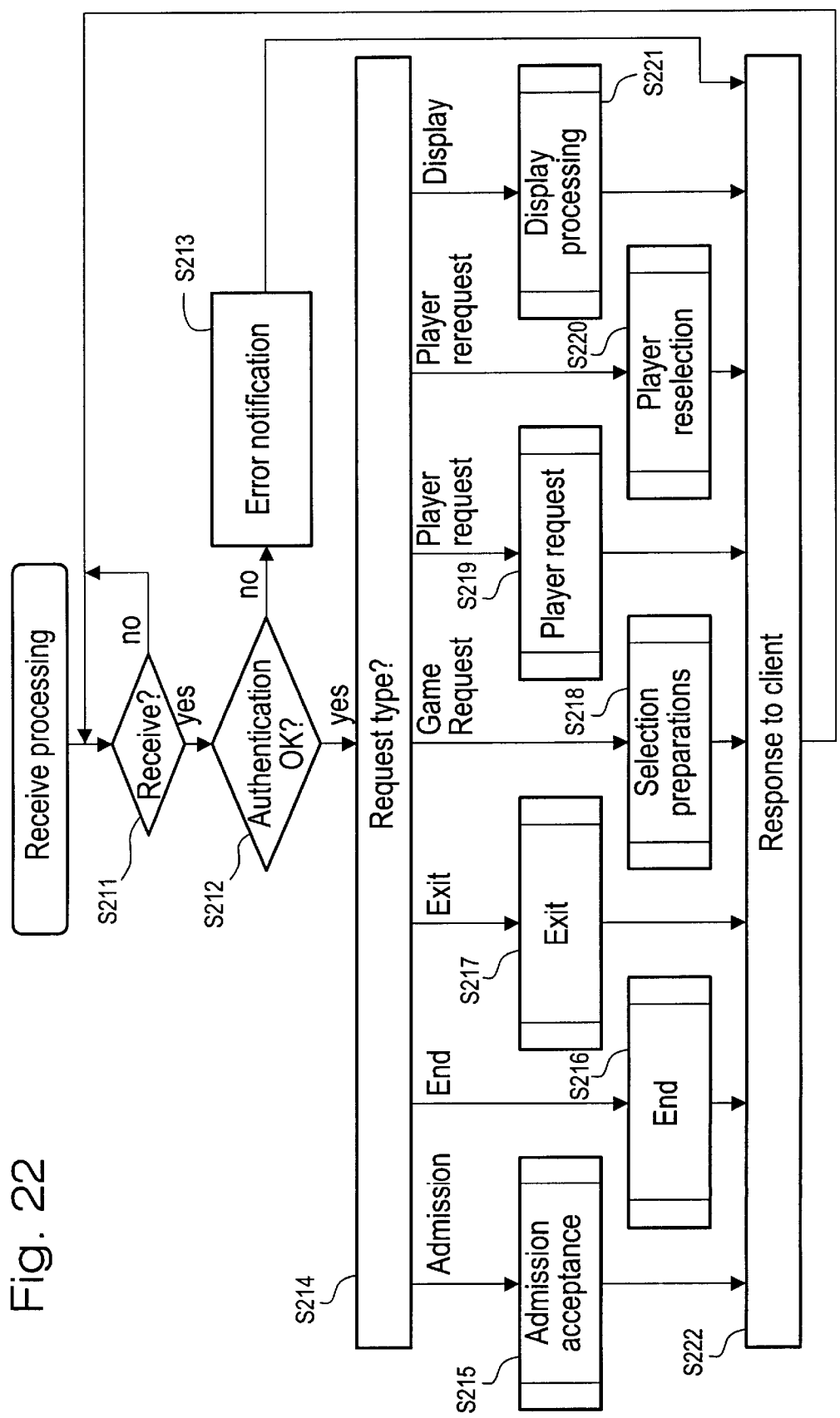
FIG. 22 is a flowchart showing receive processing in a server.

FIG. 22 is a flowchart showing receive processing in the server.

[S211] The network OS 310 determines whether receive data arrives, and on receipt of a request, proceeds to step S212. Otherwise it repeats this processing.

[S212] On receiving receive data, the authentication unit 320 determines whether it is issued from a legitimate user. For a legitimate user, it proceeds to step S214, and for an illegitimate user, it proceeds to step S213.

[S213] In the event of failure in authentication of the received request, the authentication unit 320 creates an error message.

[S214] For a legitimate user, the authentication unit 320 determines the type of the received request and passes control to an appropriate processing module.

Figure 23:
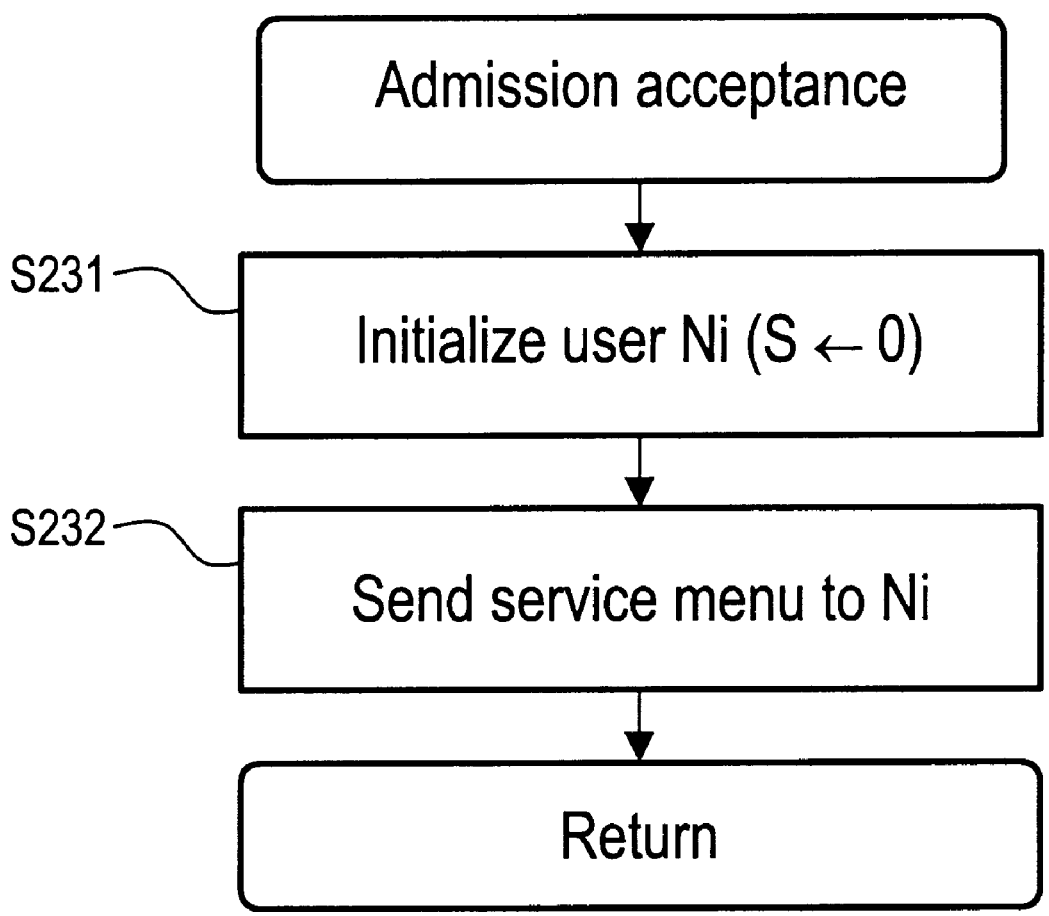
FIG. 23 is a flowchart of an admission acceptance subroutine.

[S215] For an admission request, the admission acceptance unit 330 performs admission acceptance processing (details are given in FIG. 23).

Figure 24:
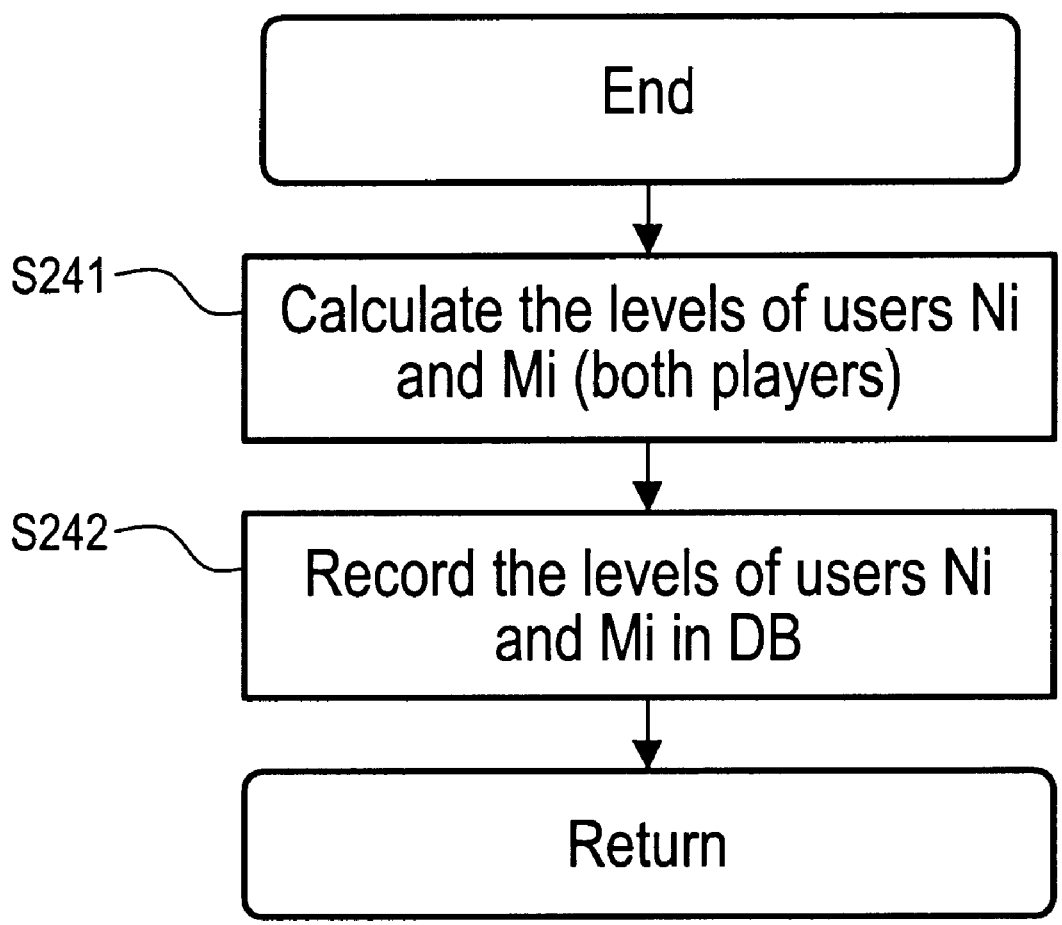
FIG. 24 is a flowchart of an end subroutine.

[S216] For an end request, the level evaluation unit 370 performs end processing (details are given in FIG. 24).

Figure 25:
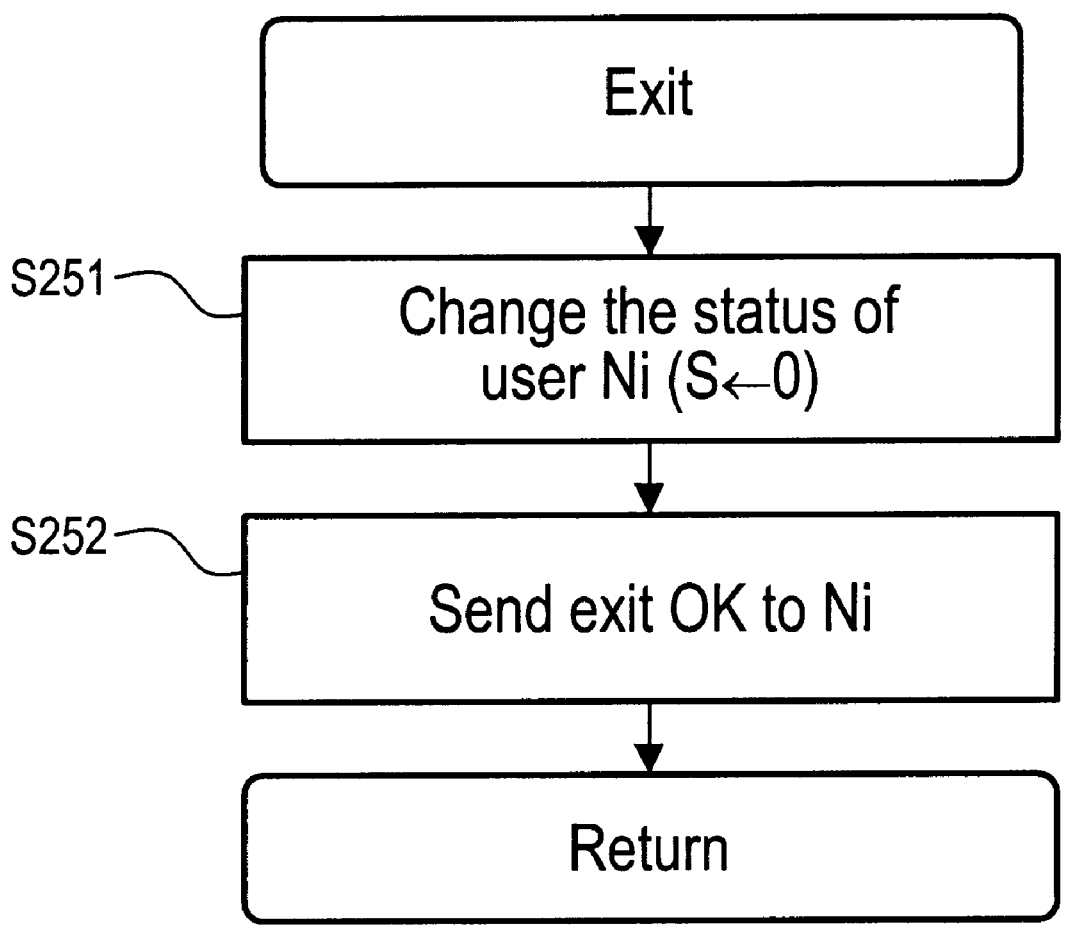
FIG. 25 is a flowchart of an exit subroutine.

[S217] For an exit request, the exiting player acceptance unit 340 performs exit processing (details are given in FIG. 25).

[S218] For a game request, the player selection processing unit 350 performs selection preparation processing (details of this processing are the same as those of processing of the first embodiment shown in FIG. 9).

[S219] For a player request, the player selection processing unit 350 performs player request processing (details of this processing are the same as those of processing of the first embodiment shown in FIG. 10).

Figure 26:
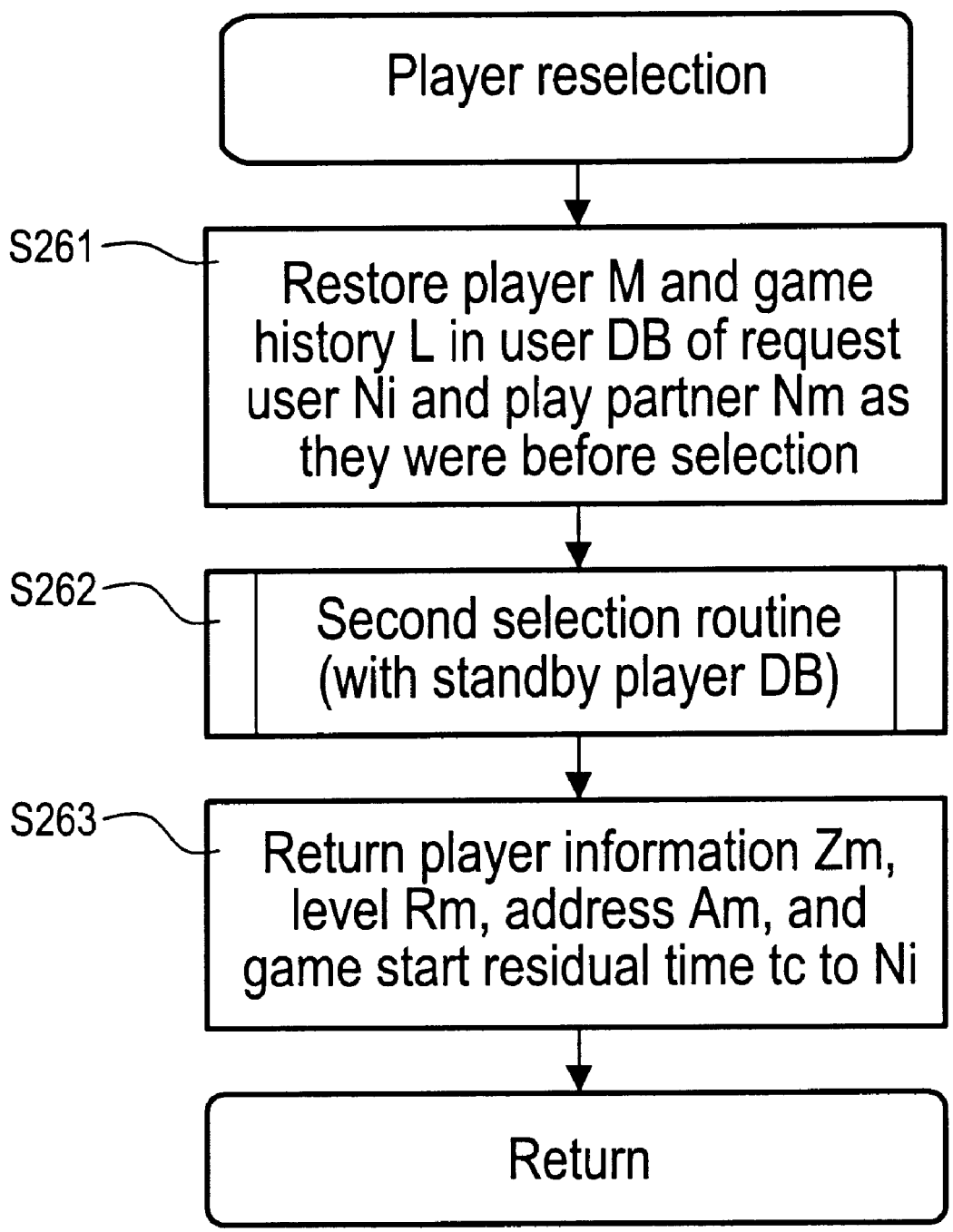
FIG. 26 is a flowchart of a player reselection subroutine.

[S220] For a player rerequest, the player selection processing unit 350 performs player reselection processing (details are given in FIG. 26).

[S221] For a display request, the display information output unit 380 obtains requested data from the user DB 361.

[S222] Upon termination of the steps S213, and S215 to S221, a device that performed the particular process returns processing results to a requesting client. A packet is actually created by the network OS 310. Subsequently, returns to step S211 to provide for the next reception.

FIG. 23 is a flowchart of the admission acceptance subroutine. This processing is performed in the participant acceptance unit 330 when an admission request occurs.

[S231] It initializes the status of requesting user Ni (S←0).
[S232] It returns a service menu of this system to the user Ni. The service menu specifically includes a game request, a player change, and an exit.

FIG. 24 is a flowchart of an end subroutine. This processing is performed in the level evaluation unit 370 when an end request occurs.

[S241] It calculates the levels of the user Ni issuing an end request and an opposing player Mi based on the results of game and the original levels of them.

[S242] It records the result of the calculation in the user DB 361. It returns an processing completion indication to the user Ni and terminates the processing.

FIG. 25 is a flowchart of an exit subroutine. This processing is performed in the exiting player acceptance unit 340 when an exit request occurs.

[S251] It changes the status of a user issuing an exit request (S ←0).

[S252] It returns an exit acknowledgment indication to a user Ni and terminates processing.

FIG. 26 is a flowchart of a player reselection subroutine. This processing is performed in the player selection processing unit 350 when a player rerequest occurs.

[S261] It restores the player M and player history L of the user DB 361 with respect to a requesting user Ni and a user Nm selected as an opposing player thereof as they were before this automatic selection processing.

Figure 28:
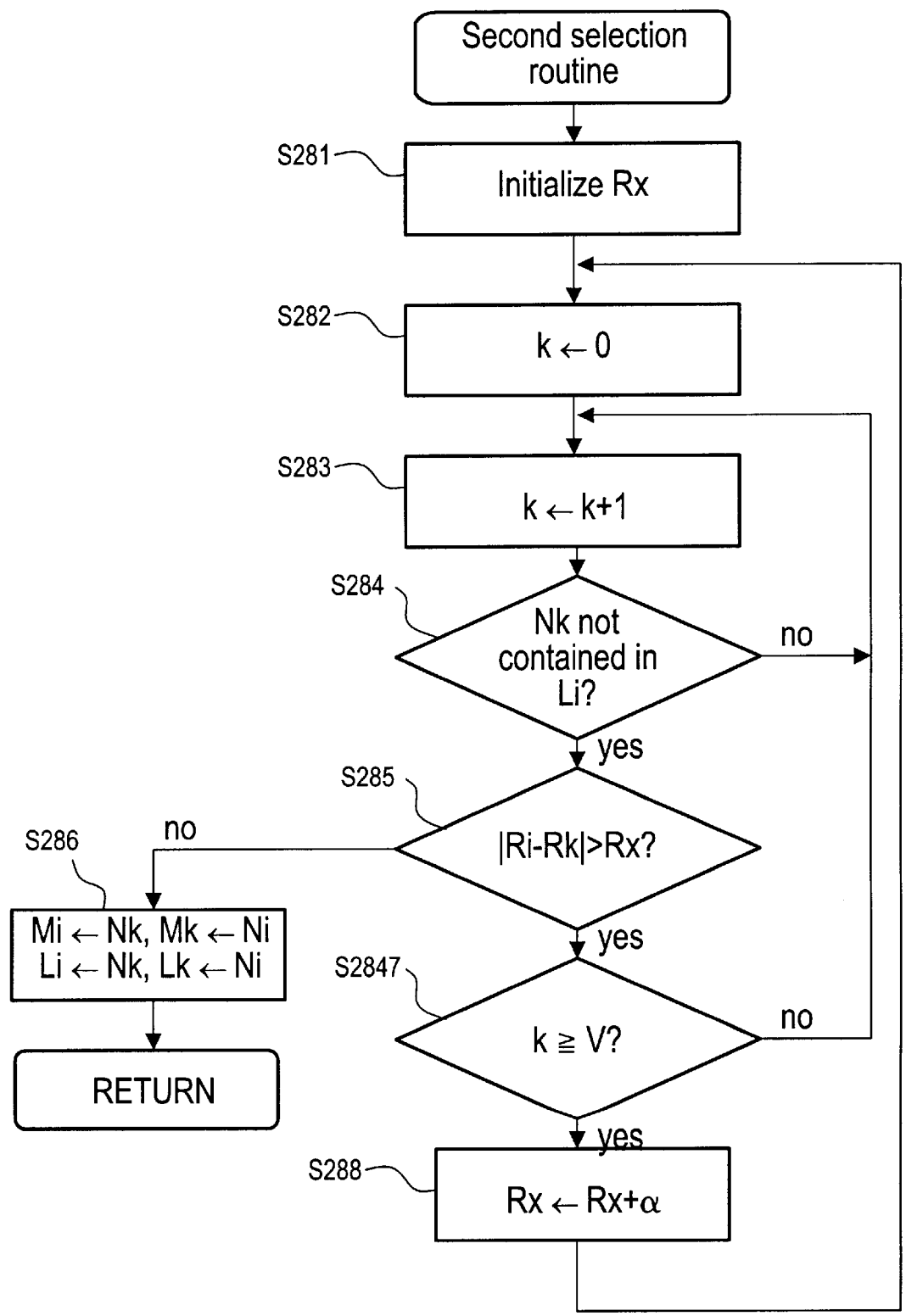
FIG. 28 is a flowchart of a second selection routine.

[S262] To select an opposing player of the requesting user Ni again, it uses a standby player DB 362 for selection (details of this processing are given in FIG. 28).

[S263] Upon termination of selection, it returns player information and the level of a selected player, and the game start residual time tc to the user Ni. It records the selected player identifier Nm in the player Mi and the player history Li of the user DB 361. Of course, the player identifier Ni may be recorded in the corresponding items of the standby player DB 362.

Figure 27:
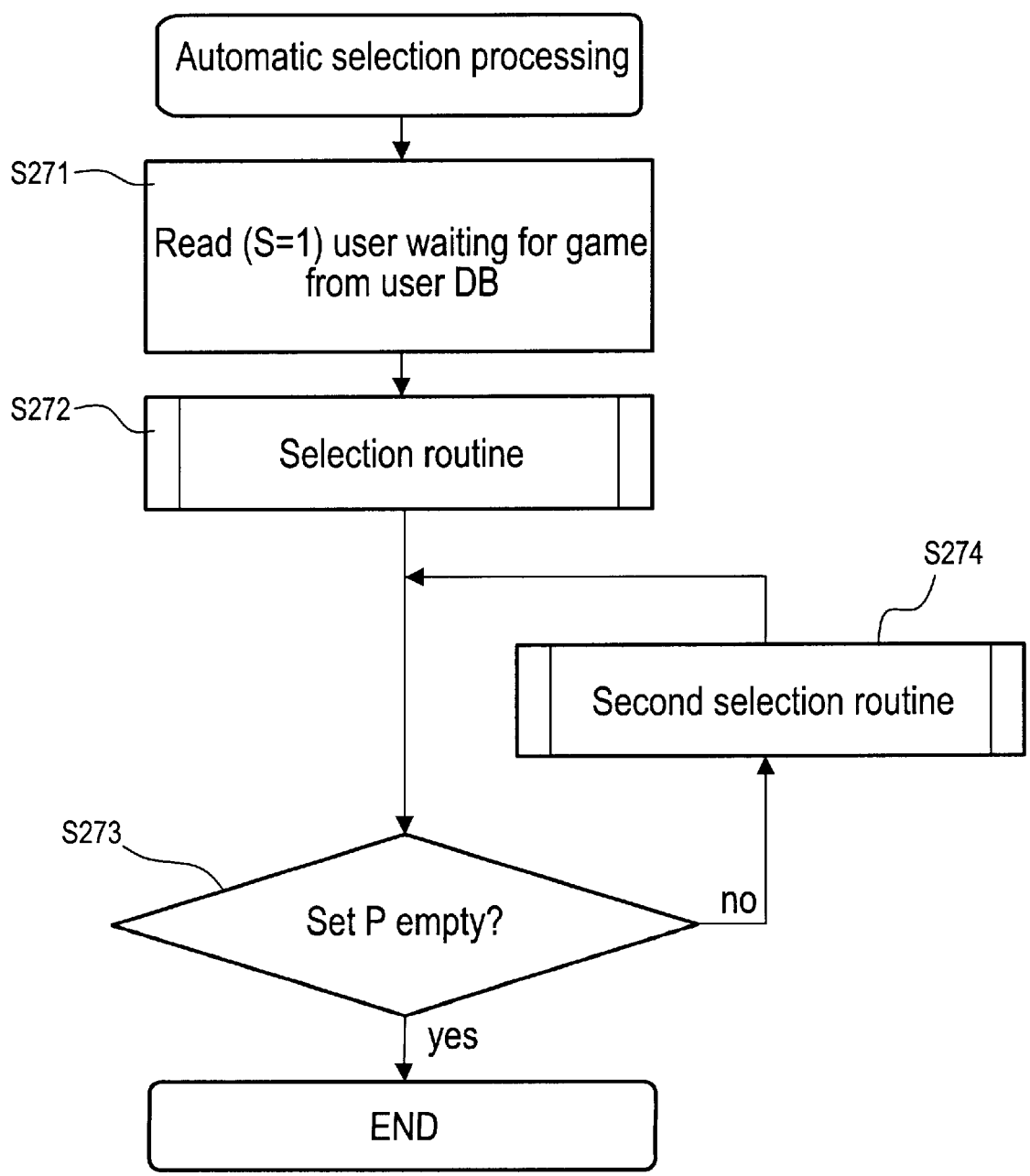
FIG. 27 is a flowchart of automatic selection processing.

FIG. 27 is a flowchart of automatic selection processing.

[S271] It reads users waiting for a game (S=1) from the user DB 361.

[S272] It executes the selection routine (shown in FIG. 12).

[S273] When the set P is empty, that is, when play partners have been selected for all users waiting for a game, it terminates the automatic selection processing. Otherwise, it proceeds to step S274.

[S274] It executes a second selection routine (shown in FIG. 28) to find opposing players from the standby player DB 362.

FIG. 28 is a flowchart of the second selection routine.

[S281] It initializes (sets) Rx. Rx is a reference value of the differences between levels. If the difference of levels of both users falls within this range, the users are selected as players.

A variable k used in this processing is in the range from 1 to the number of users registered in the standby player DB 362. The symbols N, R, M, and L have the same meaning as those used in the user DB 361.

Ni, Ri, Mi, and Li, which represent information about a user issuing a player rerequest, are fixed here. Namely, in this processing, an opposing player of one user Ni is found from the standby player DB 362.

[S282] It sets the value of a variable k to 0.

[S283] It adds 1 to the value of the variable k.

[S284] It determines whether Nk is contained in the set Li, and if contained, proceeds to a step S285. Otherwise returns to the step S283.

[S285] It determines whether the difference between a user of the item number i and a user of the item number k in level is greater than or equal to Rx (|Ri−Rx|>Rx). If the difference between levels does not exceed Rx, it proceeds to a step S286, and if greater than Rx, it proceeds to a step S287.

[S286] It registers an identifier Nk of the item number k in the player Mi of the item number i and an identifier Ni of the item number i in the player Mk of the item number k. Further, registers the identifier Nk of the item number k in the player history Li of the item number i and the identifier Ni of the item number i in the player history Lk of the item number k. Upon termination of these settings, it terminates this subroutine.

[S287] It determines whether the value of the variable k is greater than or equal to the number V of registered users. If so, it proceeds to a step S288. Otherwise it returns to the step S283.

[S288] It adds a (predetermined value smaller than Rx) to the value of Rx and proceeds to step S283 with the new value of Rx.

By this process, standby players whose level is within Rx from the level of the user Ni, of standby players Nk numbered from 1 to V are selected. Here, users (contained in the set Li) with whom a game was already played within a predetermined period or a predetermined number of games are excluded from selection.

Alternatively, combinations may be selected which allow the average of |Ri−Rx| to be minimized by rearranging the standby players.

Next, the operation of the client 400 will be described.

Figure 29:
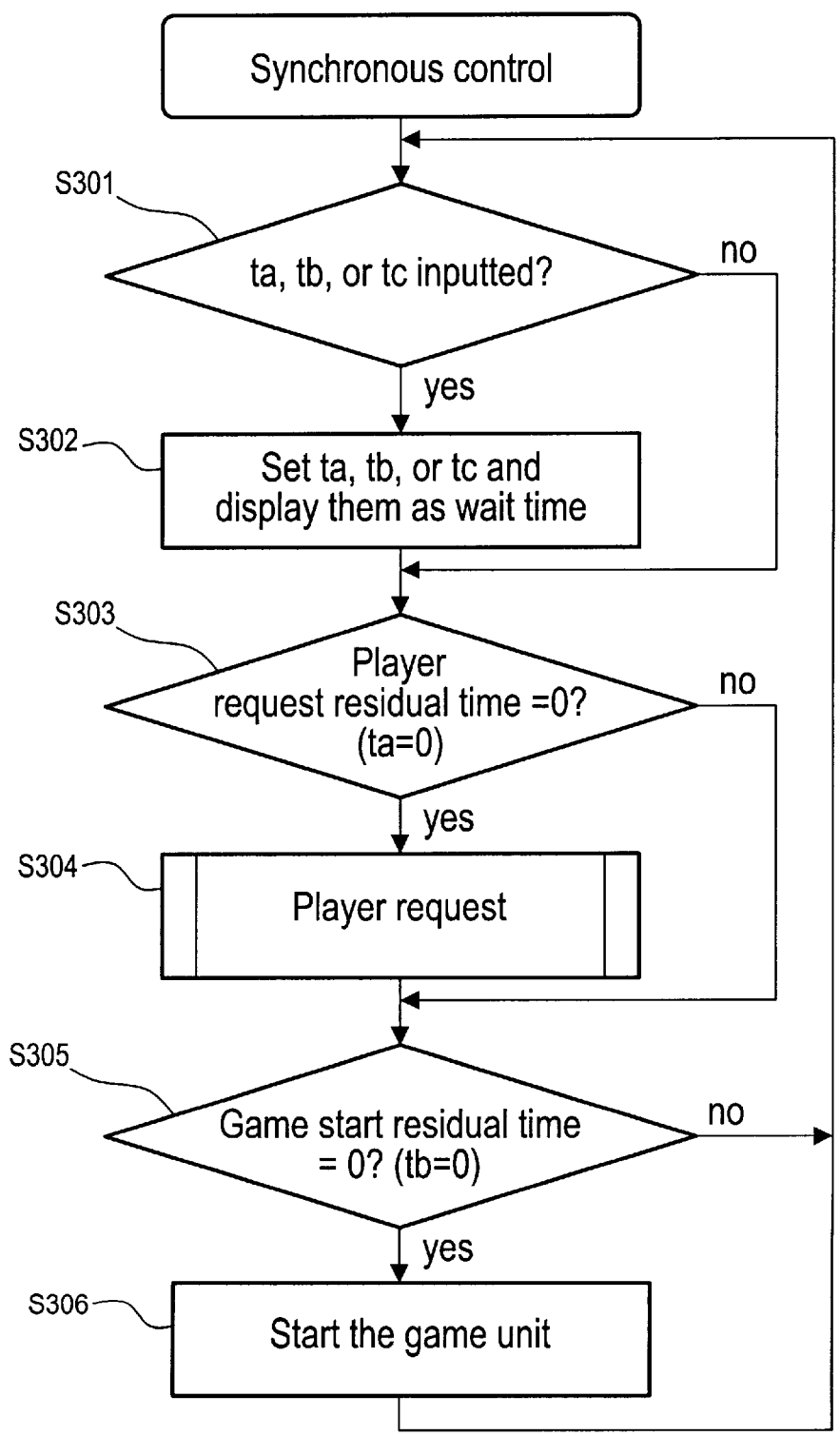
FIG. 29 is a flowchart of synchronous control processing.

FIG. 29 is a flowchart of synchronous control processing. This processing is performed in the synchronous control unit 460.

[S301] It monitors at all times whether the player request residual time ta or game start residual times tb and tc are inputted from the game request unit 440 or the player request unit 450. If they are inputted, it proceeds to step S302. Otherwise it proceeds to a step S303.

[S302] If they are inputted, it sets and counts down the time. It displays elapsed time as wait time on the user interface 420.

[S303] It determines whether the player request time ta is 0, and if it is 0, proceeds to step S304. Otherwise it proceeds to step S305.

[S304] It commands the player request unit 450 to issue a player request to the server 300 (details of this processing are the same as those of processing of the first embodiment shown in FIG. 16).

[S305] It determines whether the game start residual time tb is 0, and if it is 0, it proceeds to step S306. Otherwise it returns to step S301.

[S306] If the game start residual time becomes 0, it starts the game unit 401. This provides synchronization without players establishing contact with each other and enables a game to be started.

Figure 30:
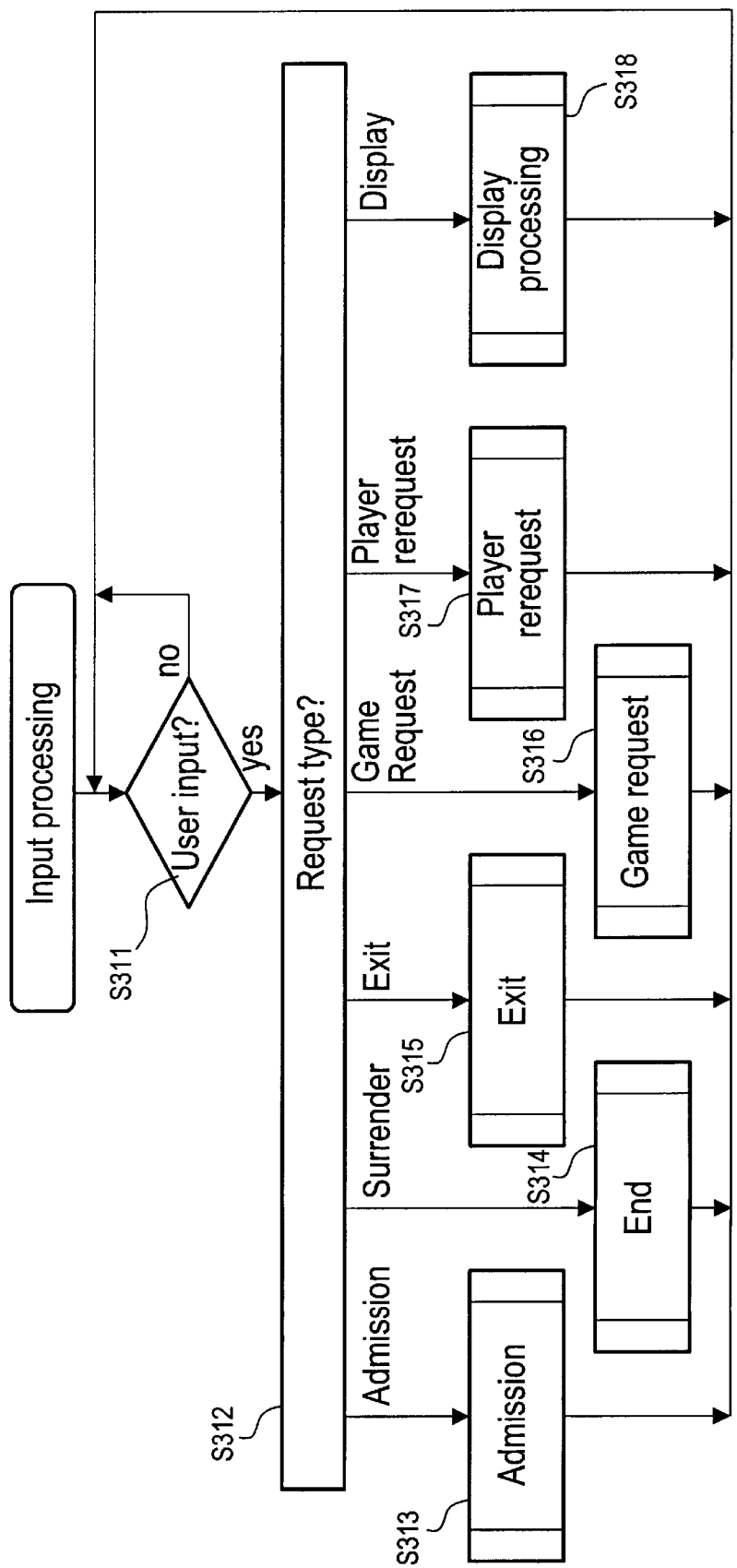
FIG. 30 is a flowchart of user input processing in a client.

FIG. 30 is a flowchart of user input processing in a client.

[S311] The user interface 420 monitors the presence of input from users. If an input is present, it proceeds to a step S312. Otherwise continues to monitor.

[S312] If a user input is present, the user interface 420 determines the type of the request and passes control to an appropriate processing module according to the request.

Figure 31:
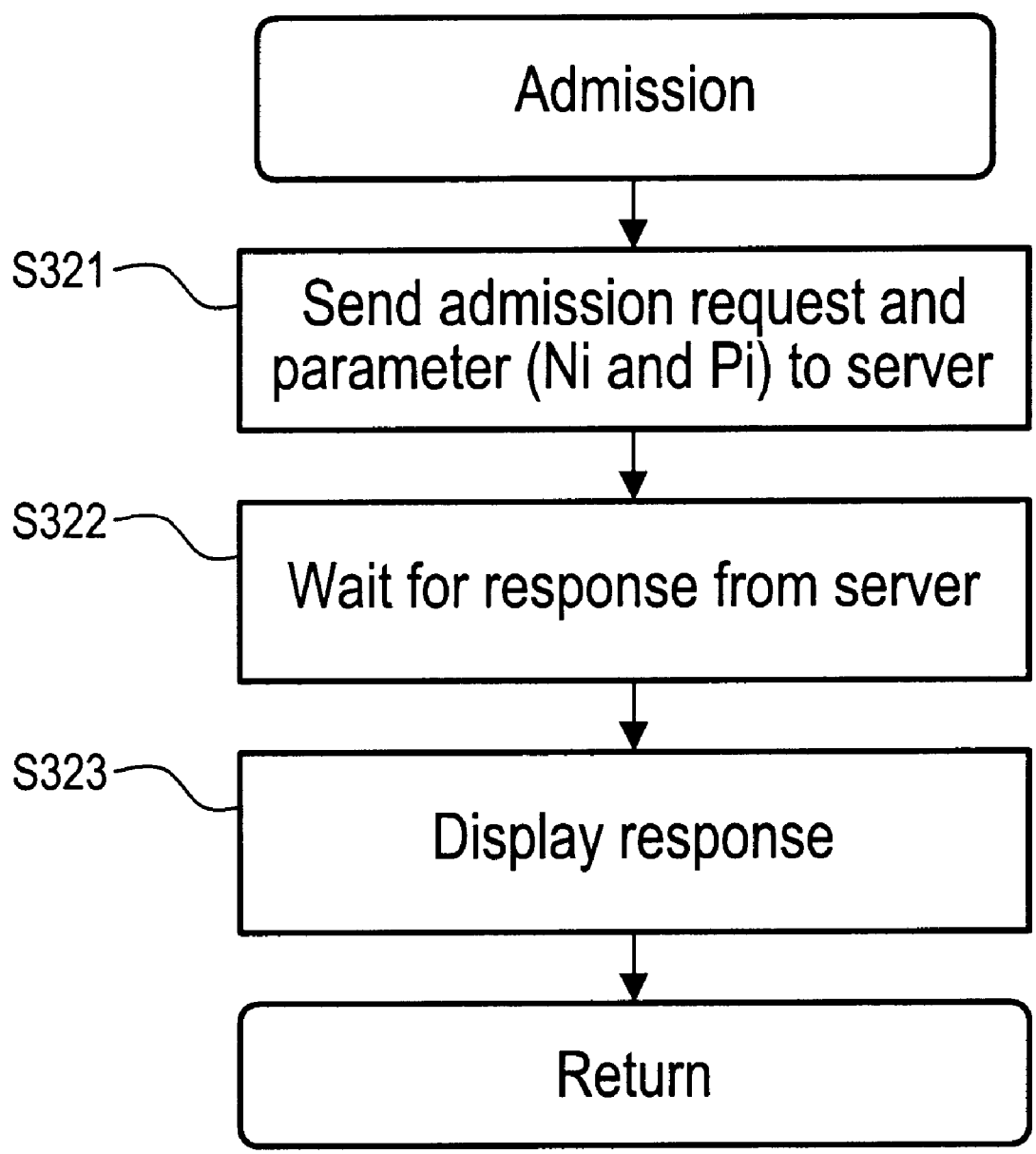
FIG. 31 is a flowchart of an admission subroutine.

[S313] For an admission request, the admission request unit 430 performs admission processing (details are given in FIG. 31).

Figure 32:
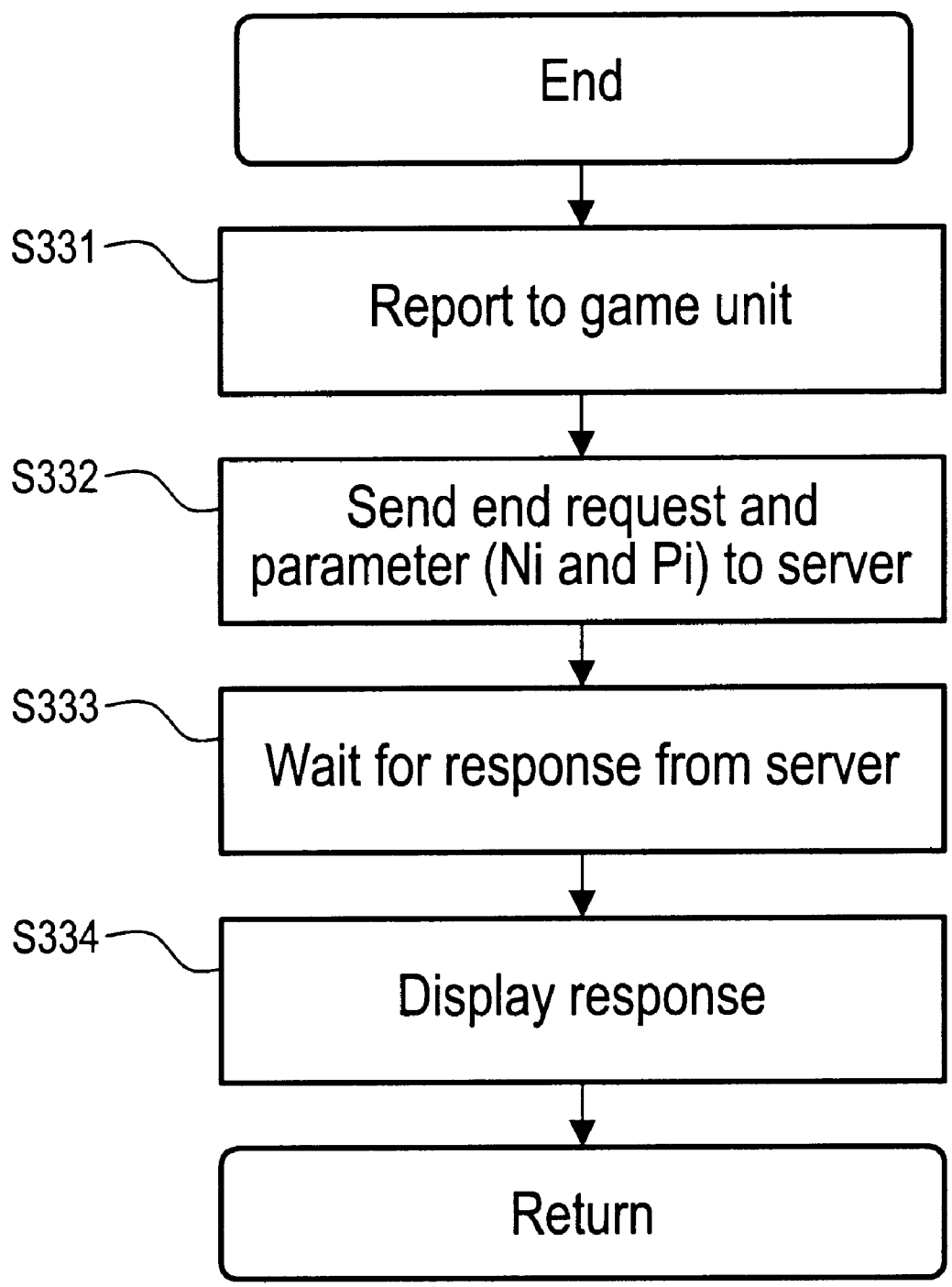
FIG. 32 is a flowchart of an end subroutine.

[S314] For a surrender request, the end request unit 470 performs end processing (details are given in FIG. 32).

Figure 33:
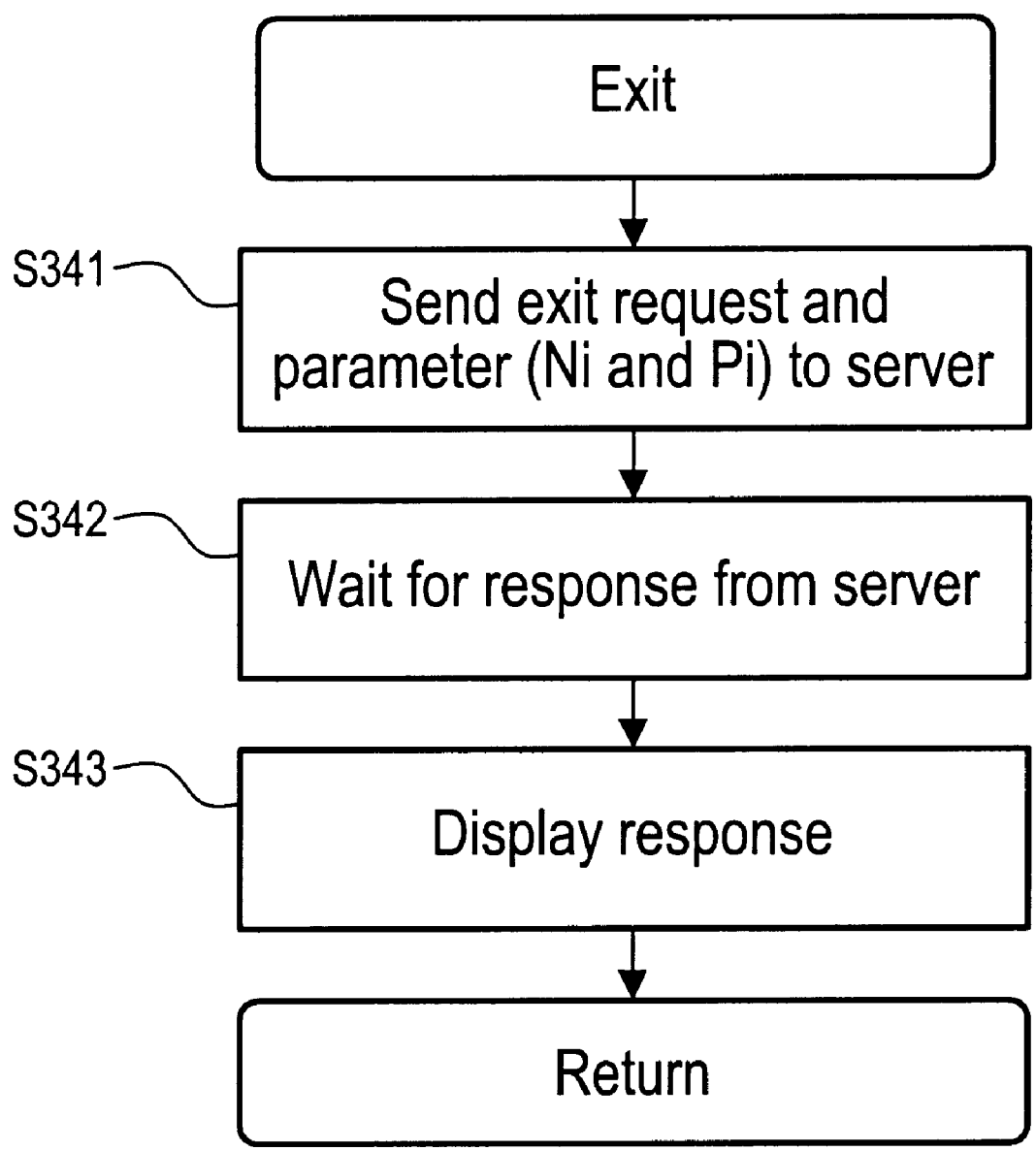
FIG. 33 is a flowchart of an exit subroutine.

[S315] For an exit request, the exit request unit 480 performs exit processing (details are given in FIG. 33).

[S316] For a game request, the game request unit 440 performs game request processing (details of this processing are the same as those of processing of the first embodiment shown in FIG. 15).

Figure 35:
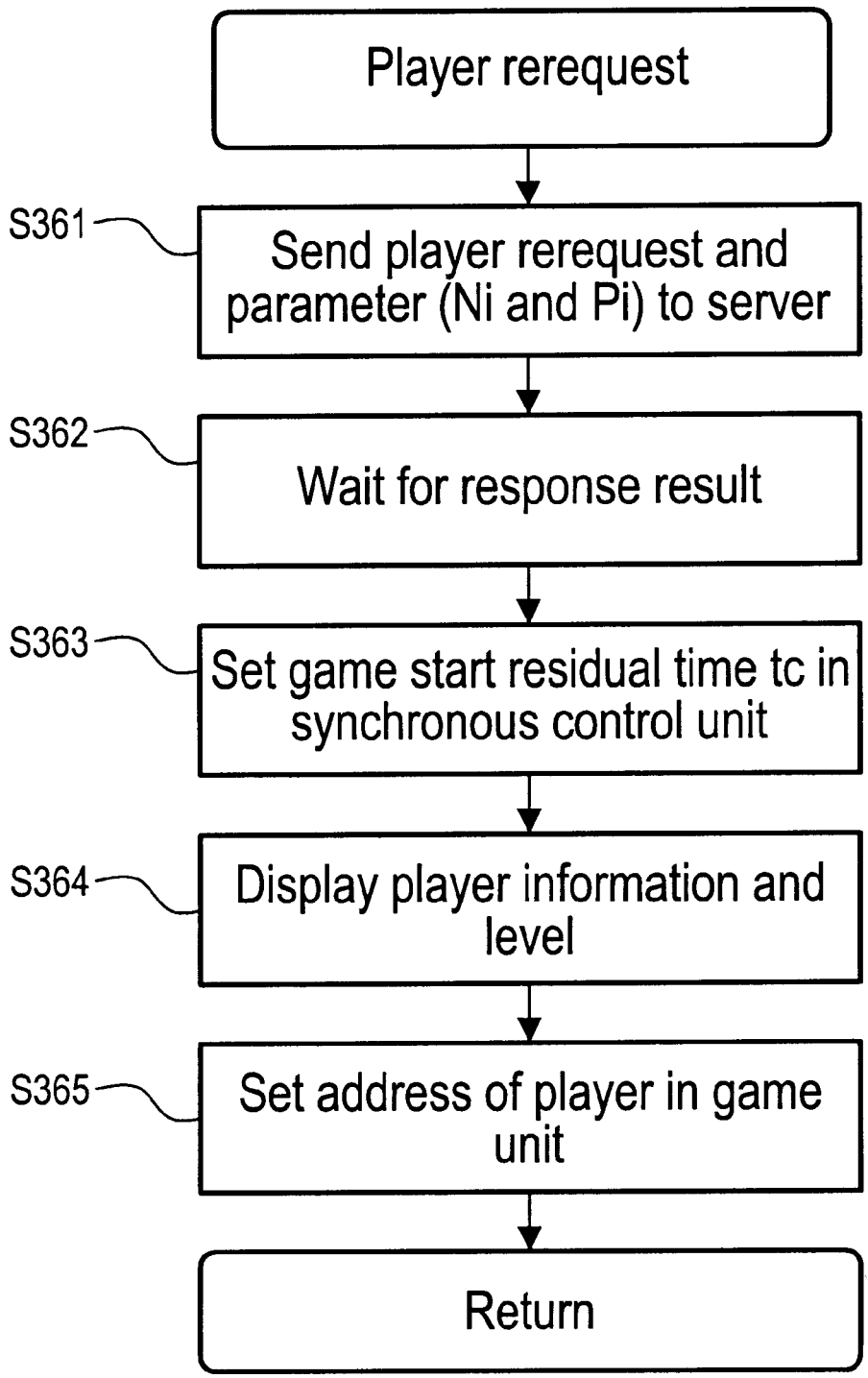
FIG. 35 is a flowchart of a player rerequest subroutine.

[S317] For a player rerequest, the player request unit 450 performs player rerequest processing (details are given in FIG. 35).

[S318] For a display request, the display request unit 490 obtains necessary data from the server and displays it on the screen of the user interface 420.

After termination of one of the above steps S313 to S318, control is returned to the step S311.

FIG. 31 is a flowchart of an admission subroutine.

[S321] It sends an admission request protocol to the server 300 along with parameters Ni and Pi.

[S322] It waits for a response from the server 300.

[S323] It displays response results form the server 300.

FIG. 32 is a flowchart of an end subroutine. This subroutine is executed by a user clicking on the end button 420b.

[S331] It sends an end indication to the game unit 401 so that a play partner can recognize the end.

[S332] It sends an end request protocol to the server 300 along with parameters Ni and Pi.
[S333] It waits for a response from the server 300.
[S334] It displays response results form the server 300.

FIG. 33 is a flowchart of an exit subroutine.
[S341] It sends an exit processing protocol to the server 300 along with parameters Ni and Pi.
[S342] It waits for a response from the server 300.
[S343] It displays response results form the server 300.

Figure 34:
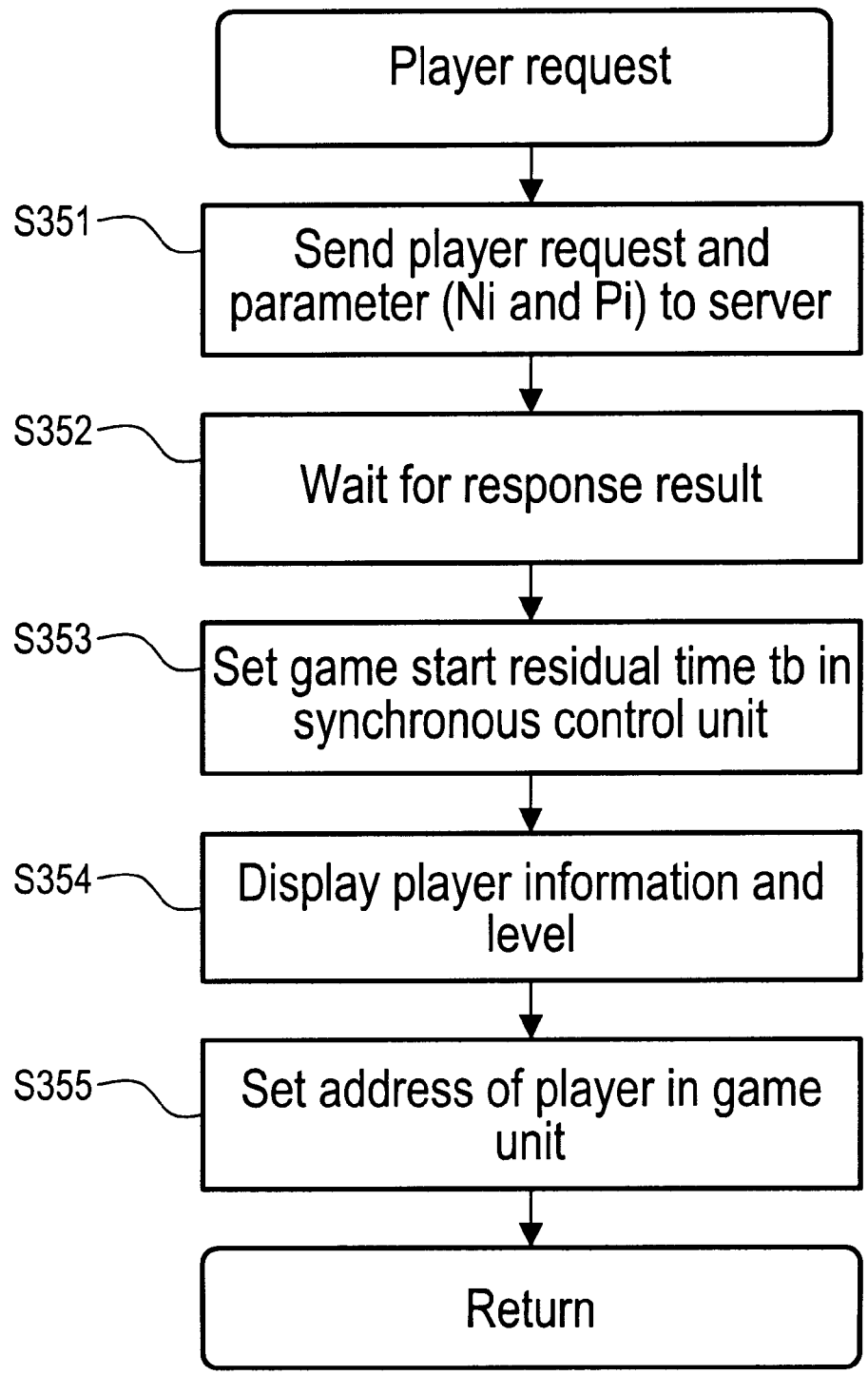
FIG. 34 is a flowchart of a player request subroutine.

FIG. 34 is a flowchart of a player request subroutine. This subroutine is started by the synchronous control unit 460 when the player request residual time ta is counted down to 0, and is executed by the player request unit 450.
[S351] It issues a player request protocol to the server 300 along with the user identifier Ni and password Pi.
[S352] It waits for a response from the server 300.
[S353] On receipt of a response from the server 300, it sets the game start residual time tb of the response in the synchronous control unit 460.
[S354] It displays player information and level contained in the response on the user interface 420.
[S355] It sets the address of a play partner in the game unit 401.

FIG. 35 is a flowchart of a player rerequest subroutine. This subroutine is executed when the player change button 420a on the user interface 420 is clicked.
[S361] It issues a player rerequest protocol to the server along with the user identifier Ni and password Pi.
[S362] It waits for a response from the server 300.
[S363] On receipt of a response from the server 300, it sets the game start residual time tb of the response in the synchronous control unit 460.
[S364] It displays player information and a level contained in the response on the user interface 420.
[S365] It sets the address of a play partner in the game unit 401.

As described above, in this embodiment, when no play partner can be selected or when users want to change a play partner, standby opposing players can be introduced by providing a standby player DB.

Since users' levels are always calculated according to the results of a game, more appropriate play partners can be selected as the number of game experiences increases.

The mechanism of admission and exit to and from the system provides improved security for the system and allows wait time for player selection to be changed to meet the situation of access to the system, thereby making it possible to start a game with the shortest wait time.

Integrating devices (game units) used for games by users with this system eliminates the need for the users to enter the addresses of opposing players and enables a game to be automatically started by the game units 401, not manually by the users.

Further, still images of an opposing player produced during a game provide increased reality for the game.

As described above, in the embodiments, the game unit 401 of client 400 plays a game in a peer-to-peer mode between clients. This can also be achieved in a server-to-client mode via the server 300. By doing so, the progress of the game can be easily observed on the server and logs can be easily obtained.

To retrieve and store user information, a normal file system can also be used in place of databases used in the embodiments.

Player rerequests, although used to change players in the embodiments, can also be used as requests to play with standby players.

In the embodiments, in response to a player request from a client, the server passes player combination information to the client. Alternatively, the player combination information can also be presented in a way that allows users to view the player combination information displayed on a homepage. Or without waiting for a player request, the server can also send the combination information to the client. Or it can also be transmitted through media such as electronic mail.

Although the embodiments have been described only on games played by two persons, the present invention is not limited to games for use by two persons. To select play partners of games played by three persons or more, e.g., mah-jong, four members can be collected to play mah-jong by repeating the selection routine of automatic selection processing three times for one user to select three play partners.

Of course, both wireless and wired networks can be used here.

The present invention can be implemented by coding processing contents of the above-described server and clients as a computer program and executing the program on the computer. In this case, the program is stored in computer-readable recording media. The computer-readable recording media include magnetic recording devices, semiconductor memory, and the like. The program can be distributed on the market in a manner that stores it in portable recording media such as CD-ROM and floppy diskette, or the program can be stored in a computer storage device connected via a network and can be transferred to other computers through the network. To execute the program on a computer, it is stored in hard disk or the like of the computer and loaded into main memory for execution.

As described above, according to a network game system of the present invention, since a partner selection unit within a server automatically selects opposing players, users are freed from efforts to select play partners by themselves, with the result of improved ease of use.

According to a network game server of the present invention, since users issuing a game request are placed in a game queue and combinations of games are determined among the users placed in the game queue, the users are freed from efforts to select play partners by themselves, with the result of improved ease of use.

According to a network game client of the present invention, since player request timing information is obtained from a server and a player request is issued at the time specified in the information, users who wish to play can automatically obtain information about opposing players.

According to a medium storing a player selection program of the present invention, if the stored program is executed on a computer, the computer can be provided with a processing function which places users issuing a game request in a game queue and determines combinations of games among users placed in the wait queue, so that automatic selection of players can be left to the computer.

According to a medium storing a player information collection program of the present invention, if the stored program is executed on a computer, the computer can be provided with a processing function which obtains player request timing information from a server and issues a player request at the time specified in the information, so that automatic collection of information about opposing players can be left to the computer.

What is claimed is:
1. A network game system in which a game is played among a plurality of users on a communication network, comprising:

a server including a user information storage unit that stores information about said plurality of users, a game request response unit that on receiving of a game request, places a user issuing said game request in a game queue and returns player request issuance timing information specifying a time to issue a player request.

2. The network game system according to claim 1, wherein said server further includes a player request response unit that on receiving said player request, extracts information about opposing players of the user issuing said player request from said user information storage unit and returns extracted information to the user issuing said player request.

3. The network game system according to claim 2, wherein said server further includes a server synchronous control unit that outputs player request issuance wait time to said game request response unit at a predetermined timing and outputs a player selection start command to said player selection processing unit;

wherein said game request response unit within said server counts down said player request issuance time, uses as said player request issuance timing information said player request issuance wait time at the time when said game request was received, and said player selection processing unit determines combinations of games when said player selection start command is received;

wherein said client further includes a client synchronous control unit that counts down said player request issuance wait time indicated by said player request issuance timing information, said player request issuance timing information being received by said game request unit, and when said player request issuance wait time becomes 0, outputs a player request issuance command to said player request unit; and wherein said player request unit within said client recognizes according to said player request issuance command that it has reached a time specified in said player request issuance timing information, and outputs said player request.

4. The network game system according to claim 2, wherein on receiving said player request, said player request response unit within said server outputs information about opposing players and game start timing information; and wherein said player request unit within said client displays said received game start timing information on a display device.

5. The network game system according to claim 2, wherein said server further includes a standby player storage unit in which standby player candidates are registered; on receiving a player rerequest, said player selection processing unit selects opposing players of the user issuing said player rerequest from said standby player storage unit; and said player request response unit extracts information about the selected opposing players from said standby player storage unit and returns the extracted information as a response to said player rerequest; and wherein said player request unit of said client issues said player rerequest to said server in accordance with a request from the user and obtains information about new opposing players as a response thereto.

6. The network game system according to claim 2, wherein said server further includes a standby player storage unit in which standby player candidates are registered; and said player selection processing unit selects opposing players among player candidates of said standby player storage unit for users whose opposing players could not be selected from said user information storage unit.

7. The network game system according to claim 2, wherein said server further includes a participant acceptance unit that on receiving an admission request, places a user issuing said admission request into an admission state and returns menu screen information necessary for use of a player selection service; and an exit acceptance unit that, on receiving an exit request, places a user issuing said exit request into an exit state and returns information indicating an occurrence of an exit event; and wherein said client further includes an admission unit that sends said admission request to said server in accordance with a request from a user and obtains said menu screen information from said server; and an exit device that sends said exit request to said server in accordance with a request from a user, and on receiving information indicating the occurrence of an exit event from said server, informs the user requesting the exit request that processing has been normally terminated.

8. The network game system according to claim 7, wherein said player selection processing unit of said server changes a timing of player selection in accordance with a number of users placed into the admission state by said participant acceptance unit.

9. The network game system according to claim 2, wherein said server further includes a level evaluation unit that on receiving an end request, calculates a level of an opposing player based on results of a game by a user issuing said end request and updates contents of said user information storage unit; and wherein said client further includes an end request unit that on receiving a game end issuance command, sends said end request to said server.

10. The network game system according to claim 2, wherein said server further includes a display information output unit that on receiving a request to display specified information within said user information storage unit, sends back the specified information; and said client further sends a display request corresponding to a display request issuance command from a user of the display request issuance command to said server and presents a response thereto to the user.

11. The network game system according to claim 2, on receiving said player request, said player request response unit within said server outputs said player information containing network address of an opposing player and game start timing information specifying a time to start a game;

wherein said client further includes: a game unit that when a game start command is inputted, plays a game with an opposing player specified in a network address through a communication network, and on receiving a surrender command from a user, sends information indicating an occurrence of a surrender event to a play partner, and on receiving a player request issuance command from a user, sends information indicating rejection of a play to a play partner; and a client synchronous control unit that when a time indicated by said game start timing information is reached, transfers said game start command to said game unit; and wherein said player request unit transfers a network address contained in said player information received from said server to said game unit.

12. The network game system according to claim 2, wherein said client further includes an image incorporating unit that sends a still image of a player to a partner client in a game, in combination with a move sent to a play partner, and on receiving the still image along with the move from said partner client, fetches the still image and displays it on a screen.

13. The network game system according to claim 1, wherein said server further includes a player selection processing unit that determines combinations of games among users placed in said game queue; and clients including a game request unit that outputs said game request to said server.

14. The network game system according to claim 13, wherein said player selection processing unit determines combinations of games at an earlier time than the time to issue said player request.

15. The network game system according to claim 14, wherein said game request unit within said client receives said player request issuance timing information from said server; and wherein said client further includes a player request unit that, when the time specified in said player request issuance timing information is reached, outputs said player request to said server and receives information about opposing players from said server.

* * * * *